US010736111B2

(12) United States Patent
Soriaga et al.

(10) Patent No.: US 10,736,111 B2
(45) Date of Patent: Aug. 4, 2020

(54) DEVICES AND METHODS FOR FACILITATING NON-ORTHOGONAL WIRELESS COMMUNICATIONS

(71) Applicant: QUALCOMM Incorporated, San Diego, CA (US)

(72) Inventors: Joseph Binamira Soriaga, San Diego, CA (US); Tingfang Ji, San Diego, CA (US); John Edward Smee, San Diego, CA (US); Naga Bhushan, San Diego, CA (US); Krishna Kiran Mukkavilli, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/031,979

(22) Filed: Jul. 10, 2018

(65) Prior Publication Data

US 2018/0324809 A1 Nov. 8, 2018

Related U.S. Application Data

(62) Division of application No. 14/566,383, filed on Dec. 10, 2014, now Pat. No. 10,051,634.

(Continued)

(51) Int. Cl.
*H04W 72/04* (2009.01)
*H04J 11/00* (2006.01)
(Continued)

(52) U.S. Cl.
CPC .......... *H04W 72/0466* (2013.01); *H04B 1/02* (2013.01); *H04B 7/046* (2013.01);
(Continued)

(58) Field of Classification Search
CPC .................................................. H04W 72/0466
See application file for complete search history.

(56) References Cited

U.S. PATENT DOCUMENTS

| 8,503,360 B2 | 8/2013 | Hou et al. |
| 9,407,344 B2 | 8/2016 | Ryu et al. |

(Continued)

FOREIGN PATENT DOCUMENTS

| CN | 101257367 A | 9/2008 |
| CN | 102685046 A | 9/2012 |

(Continued)

OTHER PUBLICATIONS

Taiwan Search Report—TW104118142—TIPO—dated Jul. 21, 2018.
(Continued)

*Primary Examiner* — Sulaiman Nooristany
(74) *Attorney, Agent, or Firm* — Kevin M. Donnelly; Loza & Loza, LLP

(57) ABSTRACT

Wireless communication devices are adapted to facilitate transmission and reception of non-orthogonal communications. In one example, wireless communication devices can encode an amount of data in accordance with information that at least some of the data will be transmitted as part of a non-orthogonal transmission. The wireless communication device may further transmit the encoded data, and the encoded data can be non-orthogonally combined as part of a non-orthogonal transmission. In another example, wireless communication devices can receive a wireless transmission including a plurality of data streams non-orthogonally combined together. The wireless communication device may decode at least one of the data streams. Other aspects, embodiments, and features are also included.

4 Claims, 17 Drawing Sheets

Related U.S. Application Data

(60) Provisional application No. 62/010,122, filed on Jun. 10, 2014.

(51) Int. Cl.

| | | |
|---|---|---|
| *H04J 13/00* | (2011.01) | |
| *H04B 1/02* | (2006.01) | |
| *H04B 7/0452* | (2017.01) | |
| *H04B 7/0456* | (2017.01) | |
| *H04L 1/00* | (2006.01) | |

(52) U.S. Cl.
CPC ........ *H04B 7/0452* (2013.01); *H04J 11/0033* (2013.01); *H04J 11/0046* (2013.01); *H04J 13/00* (2013.01); *H04L 1/0057* (2013.01); *H04W 72/0473* (2013.01)

(56) References Cited

U.S. PATENT DOCUMENTS

| | | | |
|---|---|---|---|
| 2004/0030979 A1* | 2/2004 | Shany | H03M 5/20 |
| | | | 714/752 |
| 2010/0034114 A1* | 2/2010 | Kim | H04L 1/0026 |
| | | | 370/252 |
| 2010/0304776 A1 | 12/2010 | Wu et al. | |
| 2012/0099446 A1 | 4/2012 | Su et al. | |
| 2013/0029706 A1 | 1/2013 | Sachs et al. | |
| 2013/0034044 A1 | 2/2013 | Hatefi et al. | |
| 2013/0196700 A1 | 8/2013 | Tiirola et al. | |
| 2013/0201884 A1 | 8/2013 | Freda et al. | |
| 2014/0029562 A1 | 1/2014 | Kishiyama | |
| 2014/0050279 A1 | 2/2014 | Kishiyama et al. | |
| 2015/0043451 A1 | 2/2015 | Goto et al. | |
| 2015/0171983 A1* | 6/2015 | Kusashima | H04J 11/004 |
| | | | 370/329 |
| 2015/0358064 A1 | 12/2015 | Benjebbour et al. | |
| 2015/0358971 A1 | 12/2015 | Soriaga et al. | |

FOREIGN PATENT DOCUMENTS

| | | |
|---|---|---|
| CN | 103493380 A | 1/2014 |
| CN | 103518339 A | 1/2014 |
| EP | 1814236 A1 | 8/2007 |
| JP | 2013009291 A | 1/2013 |
| JP | 2013214967 A | 10/2013 |
| WO | 2007033676 A1 | 3/2007 |
| WO | 2010151701 A1 | 12/2010 |
| WO | 2013035456 A1 | 3/2013 |
| WO | 2013159207 A1 | 10/2013 |
| WO | 2013176042 A1 | 11/2013 |

OTHER PUBLICATIONS

International Search Report and Written Opinion—PCT/US2015/034268—ISA/EPO—dated Aug. 28, 2015.
Shun T., et al, "User Throughput Evaluation for Orthogonal Access and Non-Orthogonal Access with SIC in Cellular Downlink", IEICE Technical Report vol. 111 No. 94, Institute of Electronics, Information and Communication Engineers (Japan), Jun. 16, 2011, 6 Pages.
Partial European Search Report—EP19186567—Search Authority—Munich—dated Oct. 30, 2019.
European Search Report—EP19186567—Search Authority—Munich—dated Apr. 1, 2020.

* cited by examiner

DEVICES AND METHODS FOR FACILITATING NON-ORTHOGONAL WIRELESS COMMUNICATIONS

PRIORITY CLAIM

The present Application for Patent is a divisional application from U.S. application Ser. No. 14/566,383 entitled "Devices and Methods for Facilitating Non-Orthogonal Wireless Communications" filed Dec. 10, 2014, which claims priority to Provisional Application No. 62/010,122 entitled "Devices and Methods For Identifying Non-Orthogonal Wireless Communications" filed Jun. 10, 2014, each of which is assigned to the assignee hereof and hereby expressly incorporated by reference herein.

TECHNICAL FIELD

The technology discussed below relates generally to wireless communications, and more specifically to methods and devices for facilitating modulation and coding to enable multiple user non-orthogonal communications in a wireless communications system.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

Multiple types of devices are adapted to utilize such wireless communications systems. These devices may be generally referred to as wireless communication devices and/or access terminals. As the demand for mobile broadband access continues to increase, research and development continue to advance wireless communication technologies not only to meet the growing demand for mobile broadband access, but to advance and enhance the user experience. In some instances, advances in the ability to share the available system resources among access terminals may be beneficial.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate non-orthogonal wireless communications within a wireless communications system. According to at least one aspect of the disclosure, wireless communication devices are disclosed, which are adapted to facilitate non-orthogonal wireless communications. In at least one example, wireless communication devices may include a receiver circuit adapted to receive a wireless downlink transmission including a first data stream non-orthogonally combined with a second data stream. The first data stream may be received in an expected constellation within the wireless transmission as a result of interference caused by the non-orthogonally combined second data stream. A decoder may be coupled to the receiver circuit to obtain the wireless transmission. The decoder may be adapted to decode the first data stream from the expected constellation within the wireless transmission, while accounting for wrap around within the first data stream.

In at least one other example, wireless communication devices may include a receiver circuit adapted to receive a wireless uplink transmission including a first data stream non-orthogonally combined with a second data stream. A decoder may be coupled to the receiver circuit to obtain the wireless transmission. The decoder may be adapted to decode the first data stream employing bit estimates associated with the second data stream as a priori information utilized to obtain bit estimates for bits associated with the first data stream.

Additional aspects of the present disclosure include methods operational on an access terminal and/or means for performing such methods. According to at least one example, such methods may include receiving a wireless downlink transmission including a first data stream non-orthogonally combined with a second data stream, where the first data stream is received in an expected constellation within the wireless transmission as a result of interference caused by the non-orthogonally combined second data stream. The first data stream may be decoded from the expected constellation within the wireless transmission, while accounting for wrap around within the first data stream.

According to at least one further example, such methods may include receiving a wireless uplink transmission including a first data stream non-orthogonally combined with a second data stream. The first data stream may be decoded employing bit estimates associated with the second data stream as a priori information utilized to obtain bit estimates for bits associated with the first data stream.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. In general, aspects of the present disclosure may be implemented in wireless communications between two or more wireless communication devices. Some examples of wireless communication devices include base stations and access terminals. By way of example and not limitation, wireless communications may occur between access terminals and one or more base stations and/or between two or more access terminals.

Figure 1:
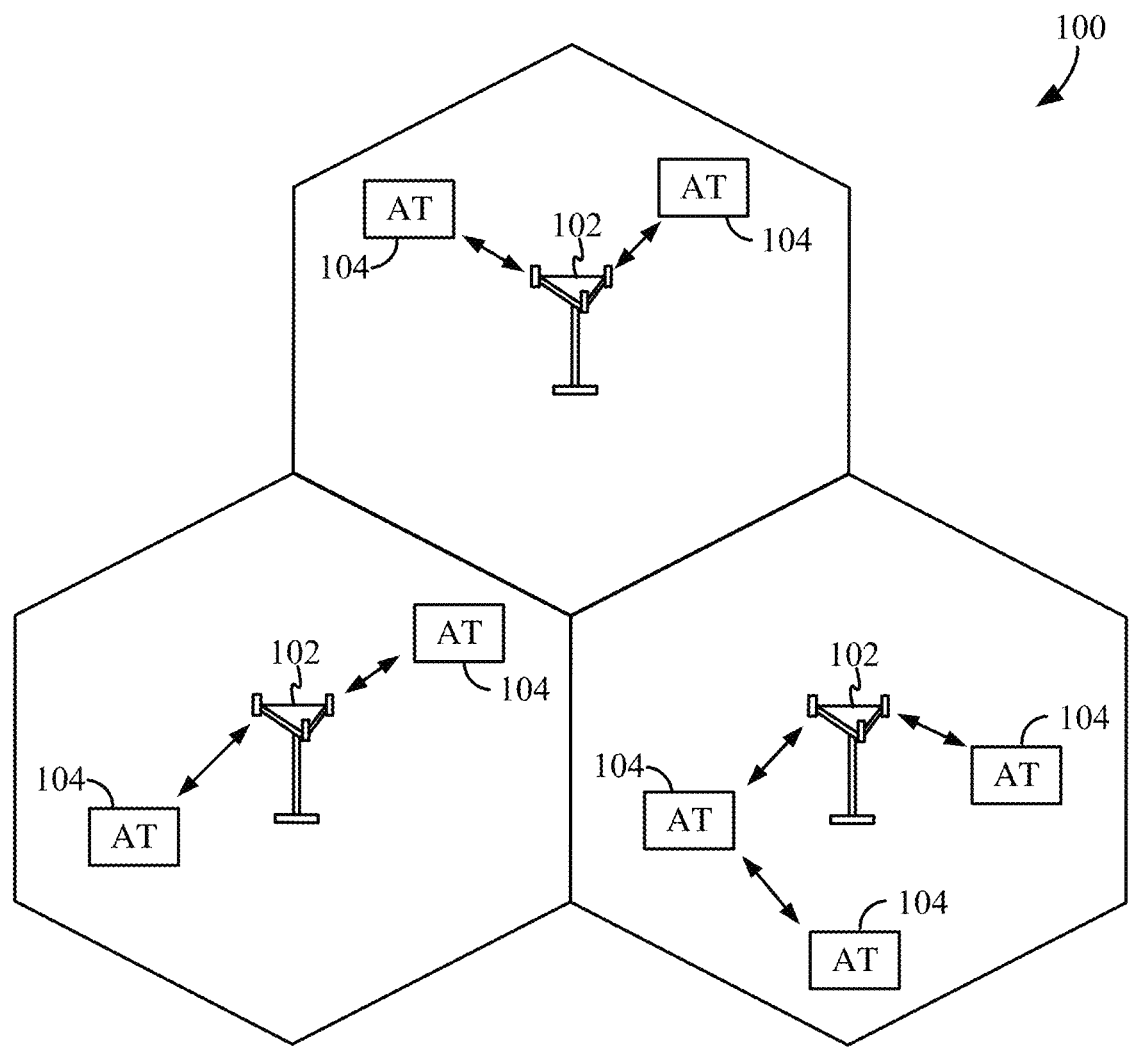
FIG. 1 is a block diagram of a network environment in which one or more aspects of the present disclosure may find application.

Referring now to FIG. 1, a block diagram of one example of a network environment in which one or more aspects of the present disclosure may find application is illustrated. In this example, the wireless communications system 100 is adapted to facilitate wireless communication between one or more base stations 102 and access terminals 104, as well as between access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna, which may also include a plurality of remote antenna units spread across a geographic region. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal. Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, sensor, sensing device, wearable device, router, and/or other communication/computing device which communicates, at least partially, through a wireless or cellular network.

Although the example in FIG. 1 depicts traditional wireless communications systems in which access terminals 104 communicate with a network through base stations 102, aspects of the present disclosure may also find application in a variety of other configurations of wireless communications systems. By way of example and not limitation, aspects of the present disclosure may find application in any wireless communication system in which wireless communications occur between two or more wireless devices. Such wireless devices may be any combination of base stations, access terminals, and/or other wireless devices.

Figure 2:
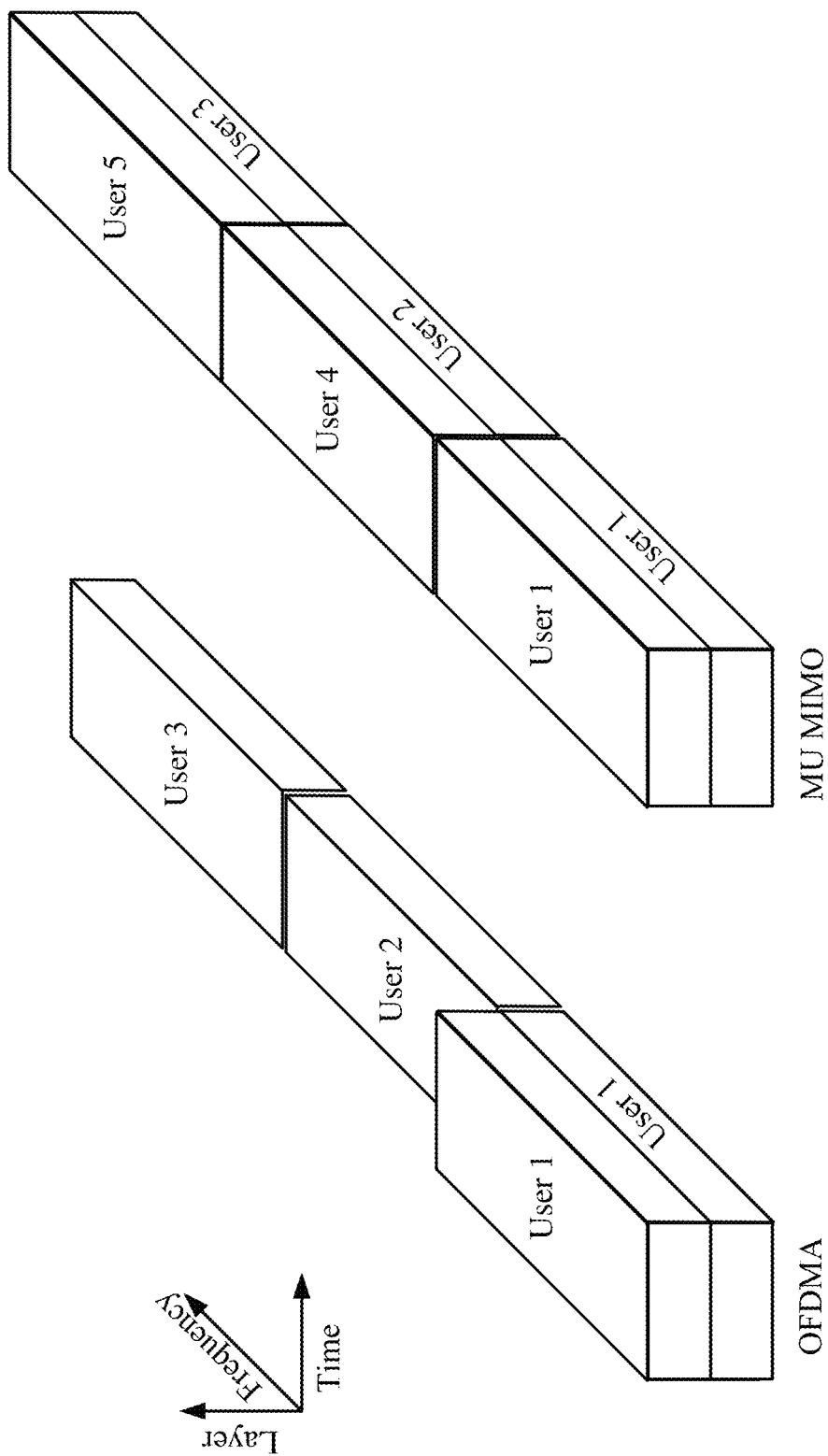
FIG. 2 is a block diagram illustrating an example of orthogonal multiple access.

As wireless devices communicate via wireless signaling, multiple devices may communicate at the same time using divisions in frequency. For example, FIG. 2 is a block diagram conceptually illustrating an example of orthogonal multiple access. As shown on the left side in FIG. 2, in orthogonal frequency division multiple access (OFDMA), one user occupies a single time and frequency resource block. Since the users are orthogonalized, they can be separated through linear processing across time and frequency. In multi-user multiple input multiple output (MU MIMO) scenarios illustrated on the right in FIG. 2, the use of multiple antennas can enable users to utilize different layers for each resource block in time and frequency, such that two users in this example can employ the same frequency in the same time, as long as they are using different divisions of space. Again, this allows the system to separate users through appropriate linear processing.

Figure 3:
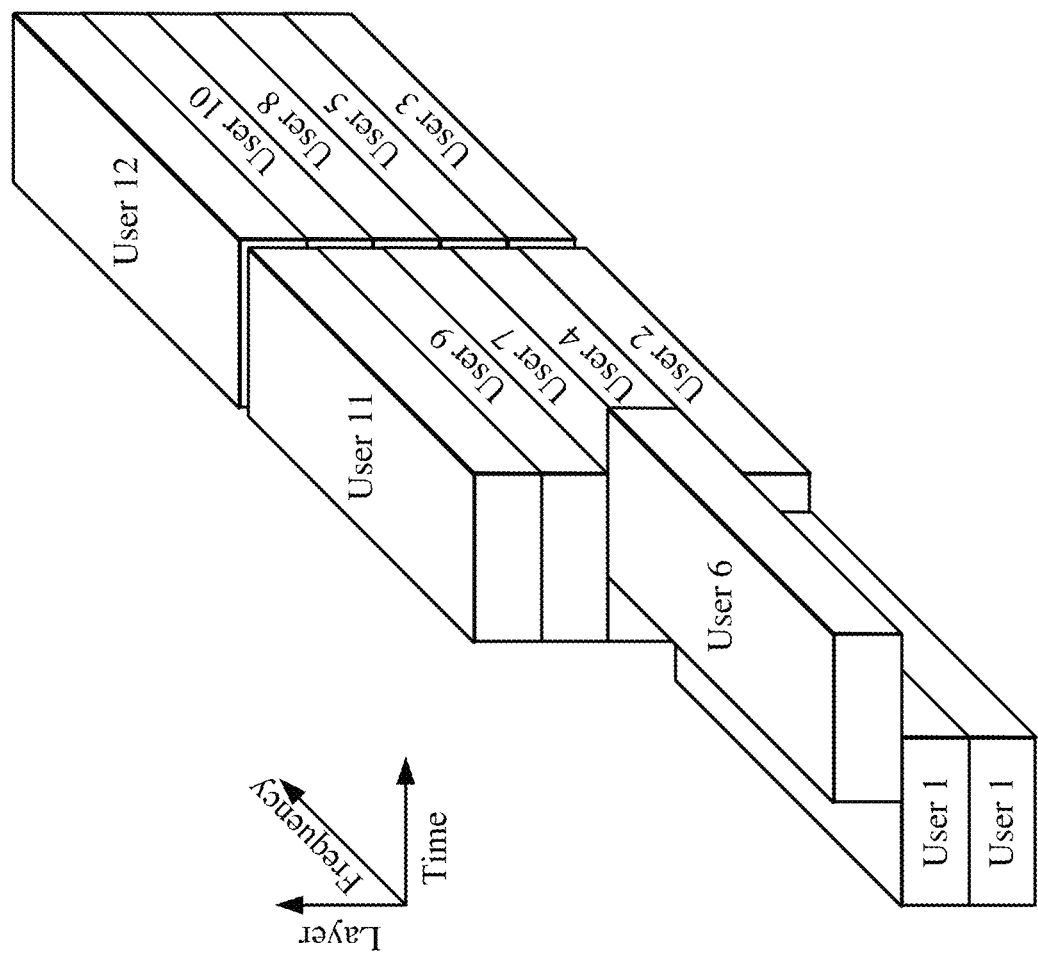
FIG. 3 is a block diagram illustrating an example of non-orthogonal multiple access according to at least one example.

According to at least one aspect of the present disclosure, wireless devices can be further adapted to facilitate an increase in the numbers of users or system capacity by employing non-orthogonal multiple access. FIG. 3 is a block diagram conceptually illustrating an example of non-orthogonal multiple access according to at least one example. As shown, the non-orthogonal multiple access may enable more users per resource block. In other words, at least some users may not be linearly separated across either time, frequency, and/or spatial dimension. For example, compared to the examples in FIG. 2 where only two users were capable of sharing a time and frequency block, the example in FIG. 3 may enable five separate users to share time and frequency blocks, with each user being in a different spatial dimension. In additional examples, as shown in FIG. 3, one or more users may be misaligned in time with the other users. For instance, User 1 and User 6 are shown as being misaligned in the time axis with each other and with the other users.

To facilitate the non-orthogonal multiple access features described herein, a receiver can be adapted to decode and cancel users to separate them and/or treat other users as noise. Such a receiver may also be adapted to deal with collisions that may occur when one or more users are not following the global timing.

Figure 4:
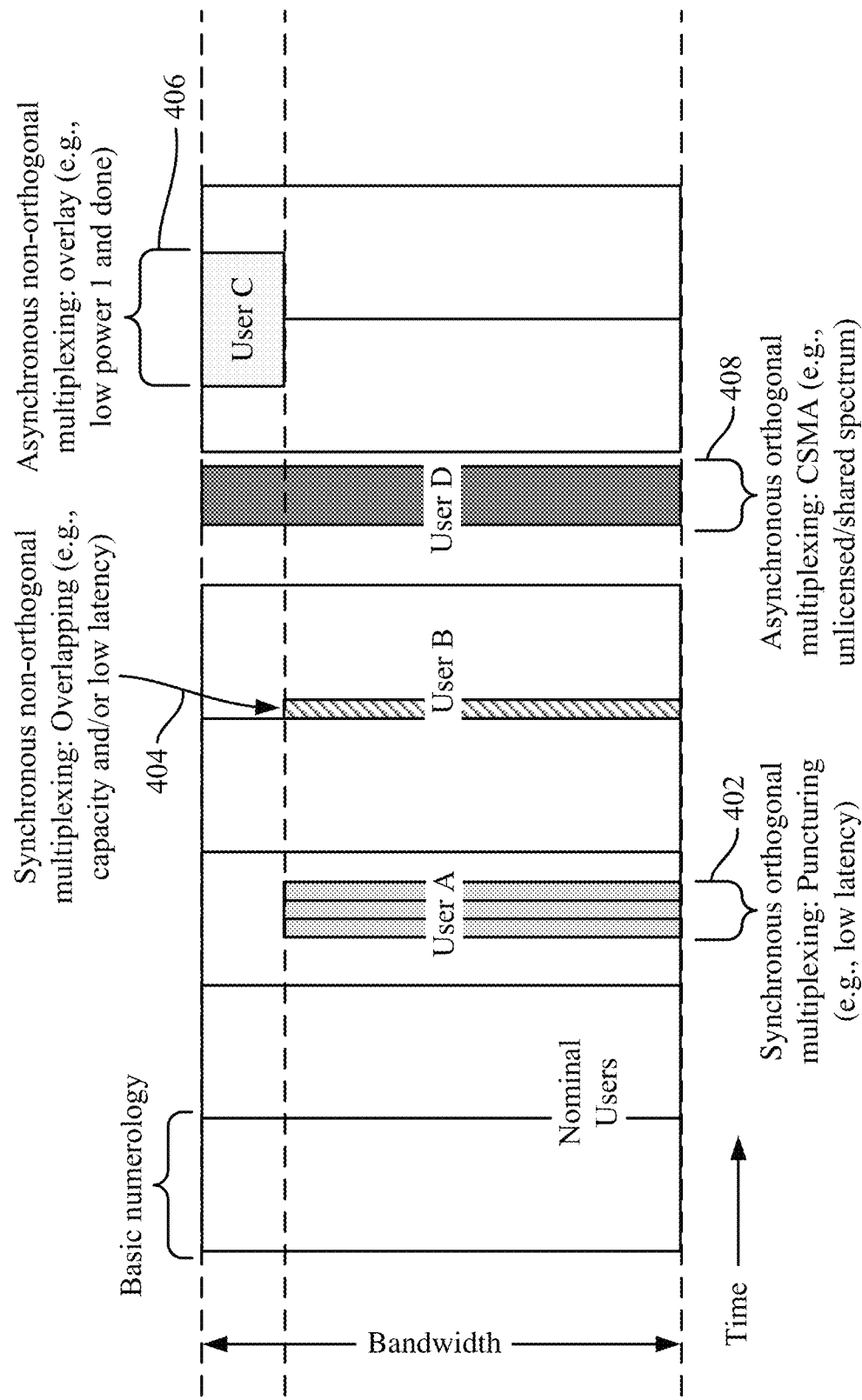
FIG. 4 is a block diagram illustrating an example of multiplexing different types of numerologies.

Referring to FIG. 4, a block diagram conceptually illustrating an example of multiplexing different types of numerologies is depicted. Some numerologies may include symbol duration, the pilot placement, etc. There may be some basic numerology that covers everything mobile, and there may be low latency optimized symbols multiplexed therein. As an example, a typical numerology to support mobility may include symbols which are 50 microseconds in duration and make up a transmission time interval (TTI) of 1 millisecond, whereas a numerology to support low latency may require a much shorter symbol of 5-10 microseconds and a shorter TTI of 0.25 millisecond. At 402, an example of synchronous orthogonal multiplexing is shown. In this example, low latency numerology from User A punctures the nominal users' numerology, so that the User A data and the nominal users' data do not collide. This is an example of time division multiplexing (TDM) where time is taken away from the nominal users and given to User A to send the low latency numerology.

In another example, at 404, a User B is employing synchronous non-orthogonal overlapping. In this instance, User B also has low latency numerology, except that the User B numerology overlaps the nominal users' transmissions. Such overlap can improve efficiencies by increasing capacity, and can reduce latencies created by puncturing with the network coordinating the stopping of transmissions by the nominal users and the transmissions by User A during that period. That is, when the two signals (e.g., nominal users' signals and User B signals) can overlap, it enables User B to transmit right away without waiting to be scheduled.

In yet another example, at 406, a User C transmission is asynchronous because it is not adhering to any of the frame boundaries. The User C transmission is also non-orthogonal because it is colliding with the nominal user transmissions. An example of a User C device may be a device that has small transmissions that is enabled to transmit as soon as an event to be reported is obtained without obtaining a grant and scheduling the transmission. By allowing the User C device to send without obtaining a grant and without worrying about scheduling, the User C device can reduce power consumption, and can reduce latency in sending transmissions.

In still another example, at 408, a User D transmission is asynchronous in time because it is not adhering to any of the frame boundaries. In this example, the User D transmission is orthogonal because it is transmitting during a period when there is no nominal user transmission. In other words, the User D transmission is orthogonal because it is on a different time-frequency resource from everyone else. An example of the User D transmission may be a carrier sense multiple access (CSMA) transmission.

Figure 5:
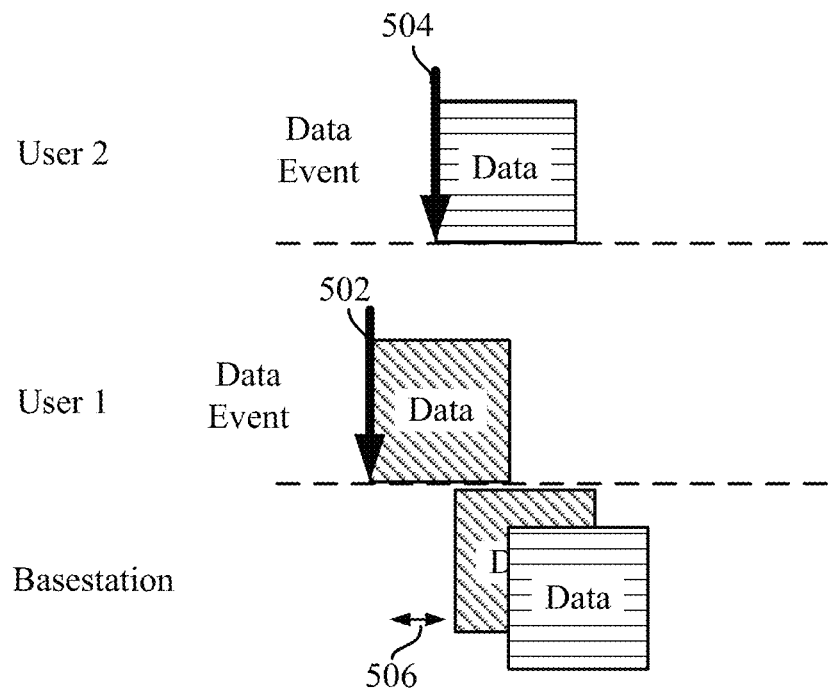
FIG. 5 is a block diagram depicting an example of asynchronous uplink transmissions leading to collisions.

Turning to FIG. 5, a block diagram is shown depicting an example of asynchronous uplink transmissions leading to collisions. As shown, a first user, User 1, may obtain data to be transmitted, and may transmit that data at a first moment in time 502. A second user, User 2, may also obtain data to be transmitted. Since there is no requirement for transmissions to be synchronous, the second user, User 2, may transmit its data at a second moment in time 504. Given a propagation delay 506, both transmissions may arrive at the receiving device (e.g., a base station) in a manner in which the transmission from User 2 overlaps or collides with the transmission from User 1. In order to receive both transmissions, the wireless devices (e.g., User 1, User 2, and receiving device) of the present disclosure may be adapted to support joint modulation and coding for non-orthogonal multiple access such that the overlapping transmissions can both be decoded (e.g., multiple simultaneous decoding).

According to at least one aspect of the present disclosure, wireless devices can employ joint modulation and encoding that is adapted to facilitate joint decoding of the transmissions that have collided.

Figure 6:
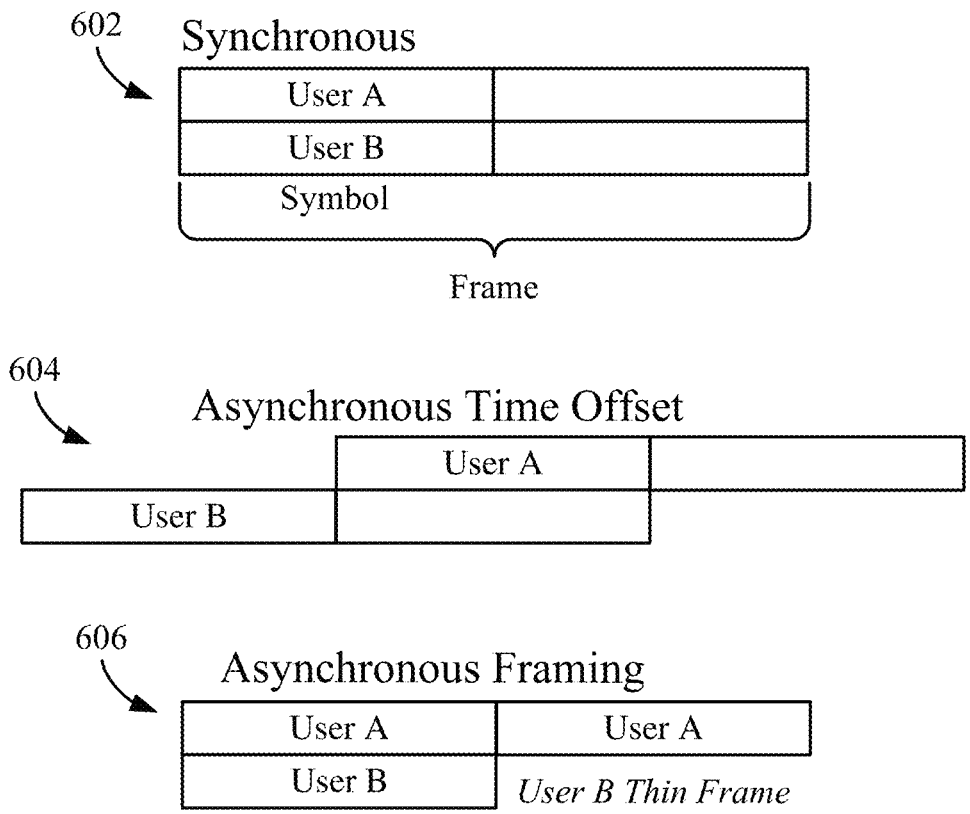
FIG. 6 is a block diagram illustrating examples of synchronous and asynchronous multiplexing.

The various aspects may have application to synchronous and asynchronous multiplexing. FIG. 6 is a block diagram conceptually illustrating examples of synchronous and asynchronous multiplexing. In the conceptual diagram, each block represents a symbol, and two consecutive blocks represent a frame. As shown, synchronous multiplexing 602 includes instances where the two users' transmissions are aligned in time, framing, and symbol numerology. Asynchronous multiplexing occurs whenever the users are not aligned in at least one of these three parameters. For instance, in the example at 604 User B is not aligned in time with User A. Thus, the two transmissions are asynchronous at 604. Further, in the example at 606 User B is not aligned in framing, since User B is transmitting a thin frame and User A is transmitting a conventional frame. Thus, the two transmissions are asynchronous at 606 as well. One additional example, which is not shown, can occur when two transmissions are even asynchronous in terms of the symbol alignment.

Figure 7:
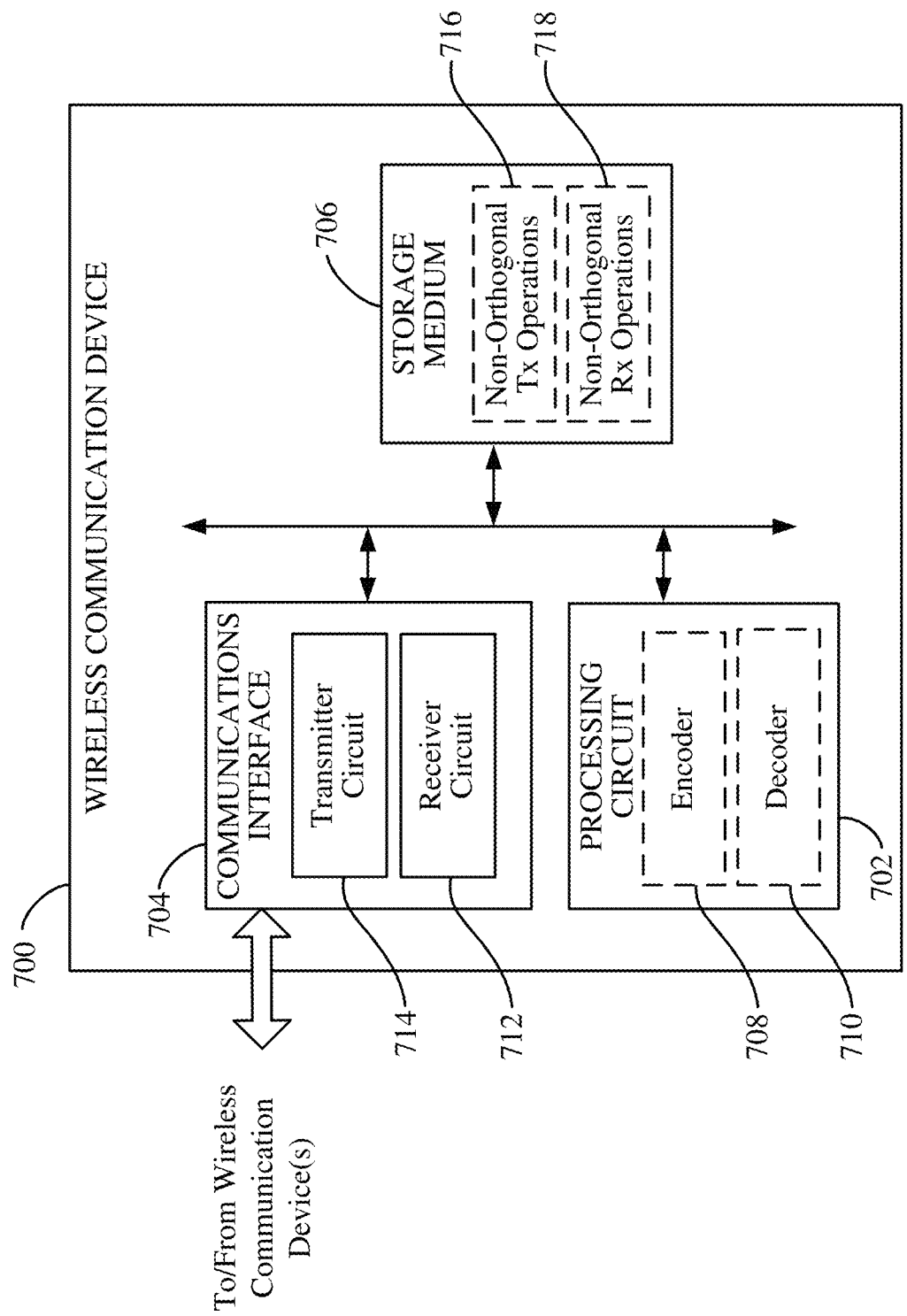
FIG. 7 is a block diagram illustrating select components of a wireless communication device according to at least one example.

Turning to FIG. 7, a block diagram is shown illustrating select components of a wireless communication device 700 according to at least one example of the present disclosure. According to various implementations of the present disclosure, the wireless communication device 700 may be configured to facilitate uplink and/or downlink non-orthogonal wireless communications. As used in the present disclosure, an uplink transmission refers to any wireless transmission sent by a transmitting wireless communication device to a receiving wireless communication device, where the receiving device is a device that receives and decodes wireless transmissions from multiple transmitting devices. Additionally, a downlink transmission refers to any wireless transmission sent by a transmitting wireless communication device to more than one receiving wireless communication devices, where each of the multiple receiving devices receives and decodes the transmissions from the transmitting device.

The wireless communication device 700 may include a processing circuit 702 coupled to or placed in electrical communication with a communications interface 704 and a storage medium 706.

The processing circuit 702 includes circuitry arranged to obtain, process and/or send data, control data access and storage, issue commands, and control other desired operations. The processing circuit 702 may include circuitry adapted to implement desired programming provided by appropriate media, and/or circuitry adapted to perform one or more functions described in this disclosure. For example, the processing circuit 702 may be implemented as one or more processors, one or more controllers, and/or other structure configured to execute executable programming Examples of the processing circuit 702 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 702 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 702 are for illustration and other suitable configurations within the scope of the present disclosure are also contemplated.

The processing circuit 702 can include circuitry adapted for processing data, including the execution of programming, which may be stored on the storage medium 706. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 702 may include an encoder 708. The encoder 708 may include circuitry and/or programming (e.g., programming stored on the storage medium 706) adapted to encode an amount of data to be transmitted by uplink non-orthogonal transmission and/or downlink non-orthogonal transmission, as discussed in more detail below. In addition or in the alternative, the processing circuit 702 may include a decoder 710. The decoder 710 may include circuitry and/or programming (e.g., programming stored on the storage medium 706) adapted to receive and decode uplink non-orthogonal transmissions and/or downlink non-orthogonal transmissions, as described in more detail below. In examples where the wireless communication device 700 includes both an encoder 708 and a decoder 710, the two components may be implemented by the same processing circuitry of the processing circuit 702, or as separate processing circuitry of the processing circuit 702.

The communications interface 704 is configured to facilitate wireless communications of the wireless communication device 700. For example, the communications interface 704 may include circuitry and/or programming adapted to facilitate the communication of information bi-directionally with respect to one or more wireless communication devices (e.g., access terminals, network entities). The communications interface 704 may be coupled to one or more antennas (not shown), and includes wireless transceiver circuitry, including at least one receiver circuit 712 (e.g., one or more receiver chains) and/or at least one transmitter circuit 714 (e.g., one or more transmitter chains). The receiver circuit 712 may be electronically coupled to the decoder 710, if present, either directly or indirectly to facilitate the conveyance of non-orthogonal transmissions from the receiver circuit 712 to the decoder 710, as discussed in greater detail below. The transmitter circuit 714 may be electronically coupled to the encoder 708, if present, either directly or indirectly to facilitate the conveyance of encoded data output by the encoder 708 for transmission by the transmitter circuit 714 as part of non-orthogonal transmissions, as discussed in greater detail below.

The storage medium 706 may represent one or more processor-readable devices for storing programming, such as processor executable code or instructions (e.g., software, firmware), electronic data, databases, or other digital information. The storage medium 706 may also be used for storing data that is manipulated by the processing circuit 702 when executing programming. The storage medium 706 may be any available media that can be accessed by a general purpose or special purpose processor, including portable or fixed storage devices, optical storage devices, and various other mediums capable of storing, containing and/or carrying programming By way of example and not limitation, the storage medium 706 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 706 may be coupled to the processing circuit 702 such that the processing circuit 702 can read information from, and write information to, the storage medium 706. That is, the storage medium 706 can be coupled to the processing circuit 702 so that the storage medium 706 is at least accessible by the processing circuit 702, including examples where the storage medium 706 is integral to the processing circuit 702 and/or examples where the storage medium 706 is separate from the processing circuit 702 (e.g., resident in the wireless communication device 700, external to the wireless communication device 700, distributed across multiple entities).

The storage medium 706 may include programming stored thereon. Such programming, when executed by the processing circuit 702, can cause the processing circuit 702 to perform one or more of the various functions and/or process steps described herein. In at least some examples, the storage medium 706 may include non-orthogonal transmission (Tx) operations 716 adapted to cause the processing circuit 702 to send uplink non-orthogonal transmissions and/or downlink non-orthogonal transmissions, as described herein. In addition or in the alternative, the storage medium 706 may include non-orthogonal reception (Rx) operations 718 adapted to cause the processing circuit 702 to receive and decode uplink non-orthogonal transmissions and/or downlink non-orthogonal transmissions, as described herein.

Thus, according to one or more aspects of the present disclosure, the processing circuit 702 is adapted to perform (independently or in conjunction with the storage medium 706) any or all of the processes, functions, steps and/or routines for any or all of the wireless communication devices described herein (e.g., base station 102, access terminal 104, wireless communication device 700, User A wireless device 1002, User B wireless device 1006, User A device 1202, User B device 1204, Receiving device 1206, wireless communication device 1302, User A wireless device 1304, User B wireless device 1306). As used herein, the term "adapted" in relation to the processing circuit 702 may refer to the processing circuit 702 being one or more of configured, employed, implemented, and/or programmed (e.g., in conjunction with the storage medium 706) to perform a particular process, function, step and/or routine according to various features described herein.

Figure 8:
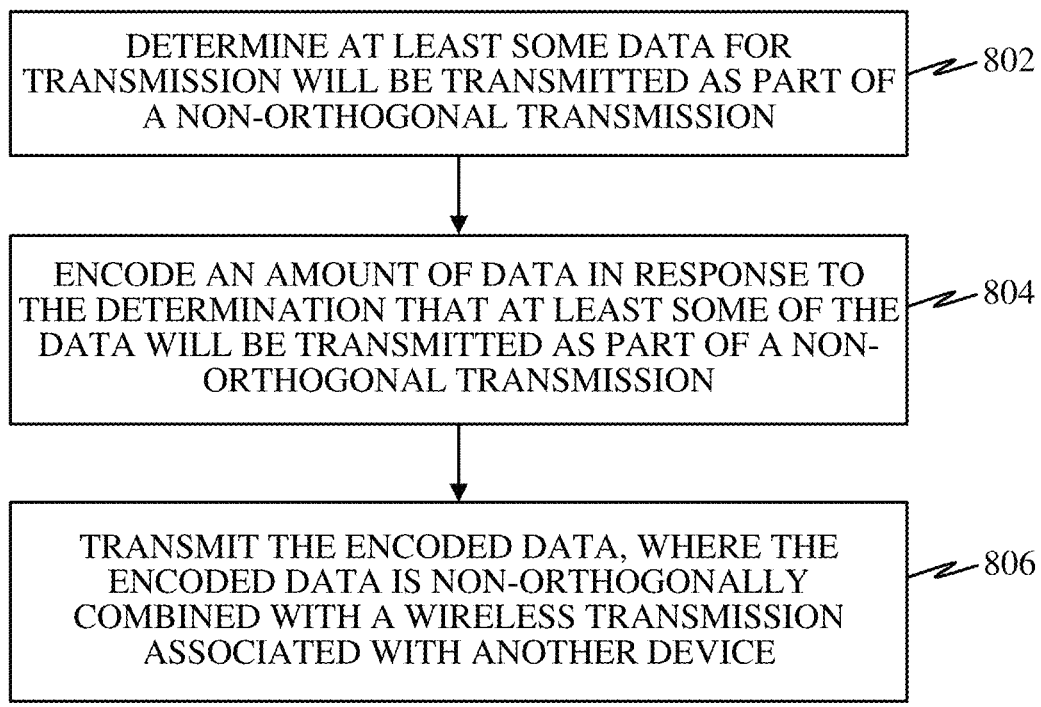
FIG. 8 is a flow diagram illustrating a method operational on a wireless communication device according to at least one example for facilitating non-orthogonal transmissions.

In operation, the wireless communication device 700 can facilitate transmissions of data non-orthogonally combined on a transmission channel FIG. 8 is a flow diagram illustrating at least one example of a method operational on a wireless communication device, such as the wireless communication device 700, for facilitating non-orthogonal transmissions. Referring to FIGS. 7 and 8, a wireless communication device 700 can determine that at least some data for transmission will be transmitted as part of a non-orthogonal transmission at 802. For example, the processing circuit 702 (e.g., the encoder 708) may be adapted to make a determination that at least some transmission data will be non-orthogonally combined with data associated with another device. In some instances, the determination may be made in accordance with information that the data will be transmitted as part of a non-orthogonal transmission.

As discussed in more detail below, the wireless communication device 700 may be an access terminal sending uplink transmissions. Such a wireless communications device 700 may make such a determination in response to information such as may be found in a transmission from a receiving device granting resources and indicating a code format to be used for the transmission. In such an example, the received transmission may not explicitly indicate a non-orthogonal combination, and the wireless communication device 700 may accordingly not make an explicit determination that the data will be transmitted as part of a non-orthogonal transmission. Instead, the indication of a specific code format can be considered such a determination when that code format was selected by the receiver in response to the data being part of a non-orthogonal transmission.

In other examples, where the wireless communication device 700 may be sending downlink transmissions, the determination may be made by the processing circuit 702 (e.g., the encoder 708) when it selects data streams associated with two or more devices to combine non-orthogonally.

At 804, the wireless communication device 700 may encode an amount of data in response to the determination at 802 that the data will be transmitted as part of a non-orthogonal transmission. For example, the processing circuit 702 (e.g., the encoder 708) may be adapted to encode an amount of data to be transmitted based on the determination that at least some of the data will be transmitted as part of a non-orthogonal transmission. For instance, the processing circuit 702 (e.g., the encoder 708) may be adapted to encode an amount of data to be transmitted in accordance with information that the data will be transmitted as part of a non-orthogonal transmission.

In some examples, the data may be encoded to be transmitted as an uplink transmission as described in greater detail below. Generally speaking, the processing circuit 702 (e.g., the encoder 708) may be adapted to encode the data according to a code format indicated by a receiving device.

In other examples, the data may be encoded to be transmitted as a downlink transmission as also described in greater detail below. In such examples, the data may include a first data stream intended for a first device and a second data stream intended for a second device. Generally speaking, the processing circuit 702 (e.g., the encoder 708) may be adapted to encode both the first data stream and the second data stream. The processing circuit 702 (e.g., the encoder 708) may be adapted to then combine the encoded first and second data streams for the non-orthogonal transmission. Further details associated with examples of such steps are described below.

At 806, the wireless communication device 700 may transmit the encoded data, where the encoded data is non-orthogonally combined with a wireless transmission associated with another device. For example, the processing circuit 702 may be adapted to transmit the encoded data via the transmitter circuit 714 of the communications interface 704. In some examples, the encoded data may be transmitted as an uplink transmission. In such examples, the encoded data can be non-orthogonally combined on an uplink channel with the wireless transmission sent by another wireless communication device, as further described below. In other examples, the encoded data may be transmitted as a downlink transmission. In such examples, a first encoded data stream can be non-orthogonally combined with a second encoded data stream prior to being transmitted by the wireless communications device 700, as further described below.

Figure 9:
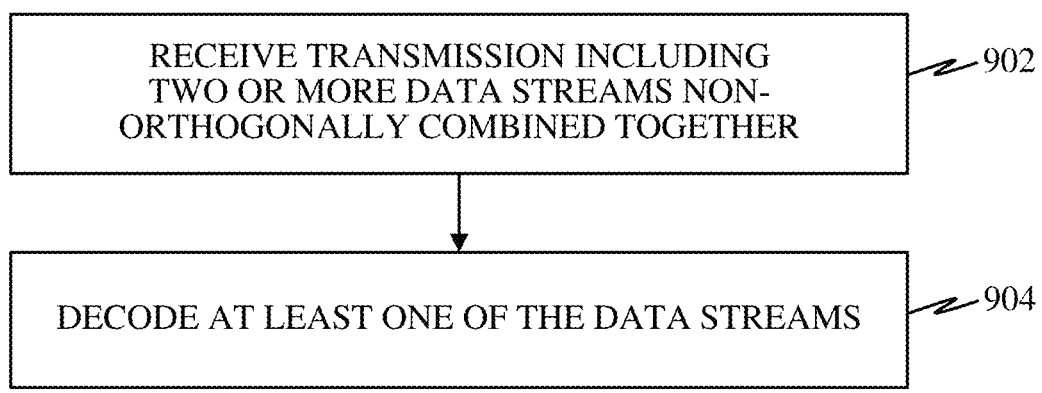
FIG. 9 is a flow diagram illustrating a method operational on a wireless communication device according to at least one example for facilitating reception of non-orthogonal transmissions.

In operation, the wireless communication device 700 may additionally or alternatively facilitate reception of data non-orthogonally combined on a transmission channel. FIG. 9 is a flow diagram illustrating at least one example of a method operational on a wireless communication device, such as the wireless communication device 700, for facilitating reception of non-orthogonal transmissions. Referring to FIGS. 7 and 9, a wireless communication device 700 can receive a transmission including a plurality of data streams non-orthogonally combined together, at 902. For example, the receiver circuit 712 of the communications interface 704 may receive a transmission, where the received transmission includes two or more data streams non-orthogonally combined together on a channel According to various implementations, the received transmission may be a received downlink transmission, or a received uplink transmission, examples for each being further described below.

At step 904, the wireless communication device 700 can decode at least one of the data streams. For example, the processing circuit 702 (e.g., the decoder 708) may be adapted to decode at least one of the data streams. In examples where the received transmission is an uplink transmission, the processing circuit 702 (e.g., the decoder 708) may be adapted to jointly decode each of the data streams at least substantially simultaneously. In some examples, processing circuit 702 (e.g., the decoder 708) may be adapted to employ bit estimates associated with one data stream as a priori information utilized to obtain bit estimates for the bits associated with another data stream. Such features are described in more detail below.

In examples where the received transmission is a downlink transmission, the wireless communication device 700 may decode a data stream intended for the wireless communication device 700. In some examples, the processing circuit 702 (e.g., the decoder 708) may be adapted to decode the data stream intended for another device, subtract the decoded data stream for the other device from the received transmission, and decode the data stream intended for the wireless communication device 700 from the received transmission without the data intended for the other device. In some examples, the processing circuit 702 (e.g., the decoder 708) may be adapted to decode the data stream intended for the wireless communication device 700 from an expected constellation within the wireless transmission, while accounting for wrap around (modulo lattice) within the data stream. In some examples, the processing circuit 702 (e.g., the decoder 708) may be adapted to decode the data stream intended for the wireless communication device 700 by treating the other non-orthogonally combined data stream(s) as noise. Such features are described in further detail below.

Figure 10:
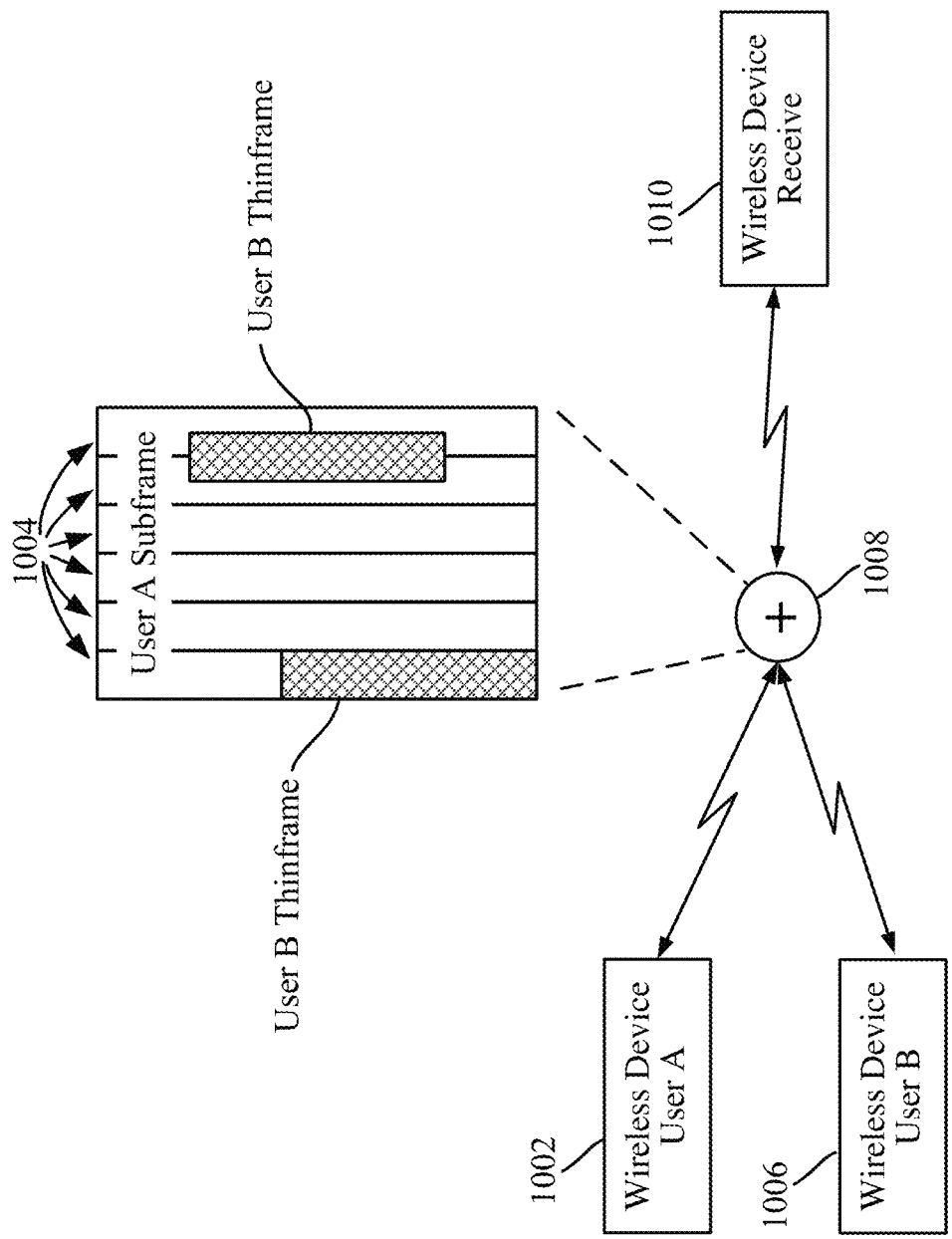
FIG. 10 is a block diagram illustrating non-orthogonal uplink transmissions according to an example.
Figure 11:
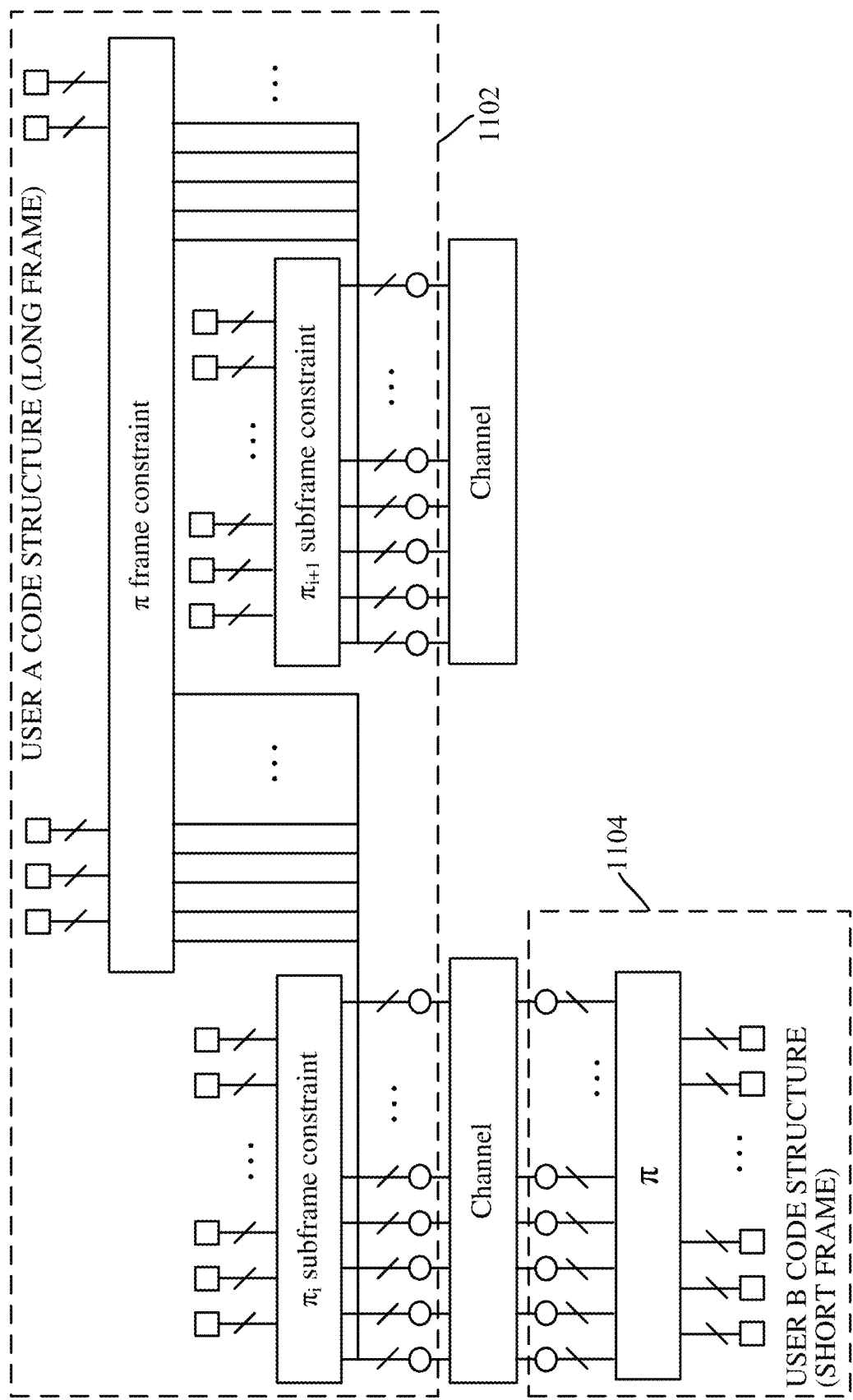
FIG. 11 is a block diagram illustrating error correcting code for the two transmissions from FIG. 10 according to at least one example.
Figure 12:
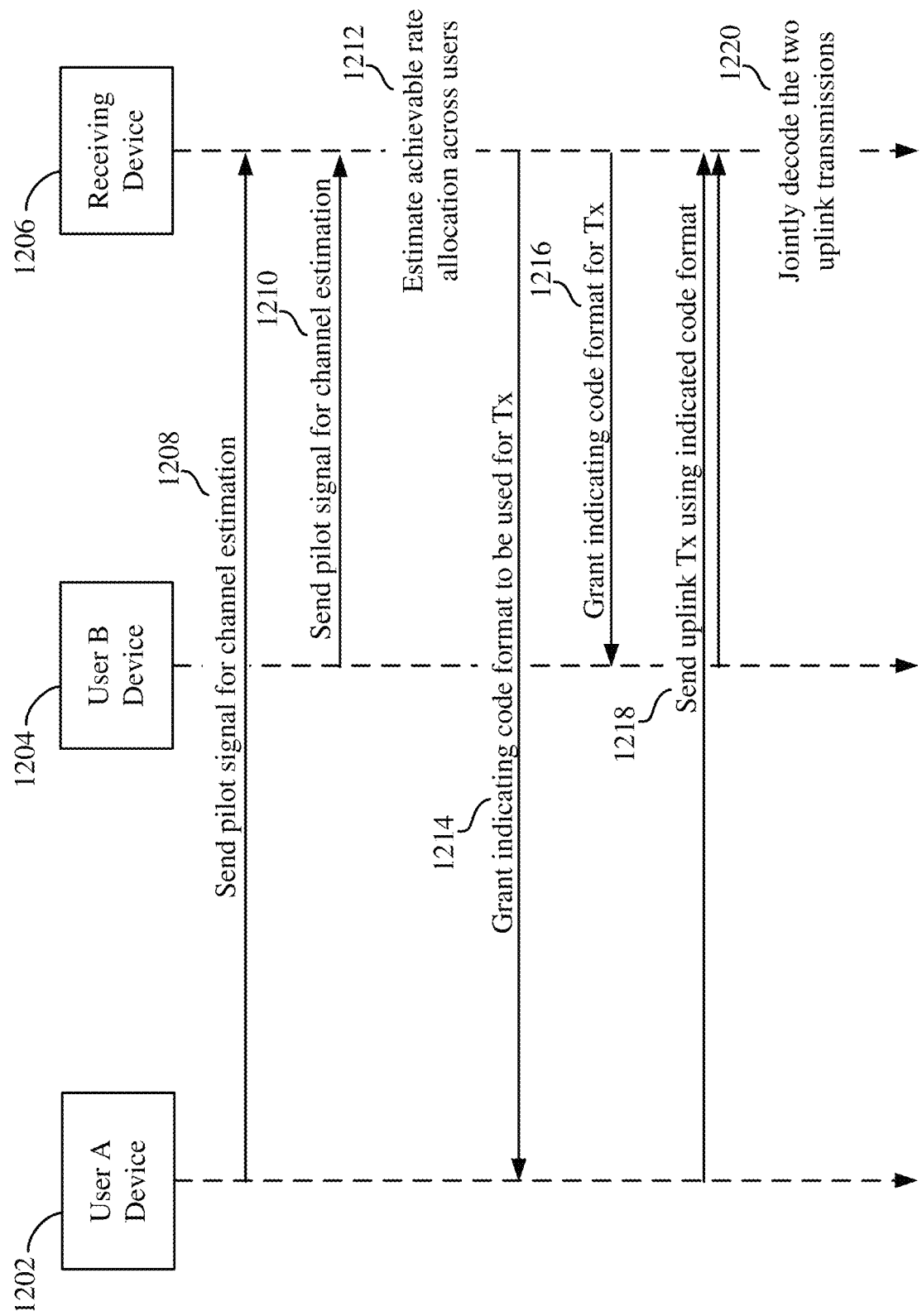
FIG. 12 is a flow diagram illustrating an example of joint uplink encoding and decoding.

FIGS. 10-12 provide additional examples of uplink transmissions including two or more non-orthogonal data streams. Turning to FIG. 10, a block diagram is shown illustrating examples of wireless communication devices facilitating non-orthogonal uplink transmissions according to an example. In the example of FIG. 10, each of the depicted wireless devices may be implemented by an embodiment of the wireless communication device 700 of FIG. 7.

As shown, a wireless device 1002 identified as User A may be transmitting uplink data on a subframe including six symbols 1004. The User A subframe may be considered a relatively large subframe that is synchronous in nature since it adheres to the frame boundaries and their timing structures. A wireless device 1006 identified as User B may obtain data for uplink transmission, where the data has a relatively small payload. According to aspects of the present disclosure, the User B wireless device 1006 can transmit the obtained uplink communication as a non-orthogonal transmission that overlaps in frequency and time with the transmissions from the User A wireless device 1002. In other words, the transmissions from the wireless device 1002 of User A and the wireless device 1006 of User B may occur at the same time, such that the two transmissions are non-orthogonally combined on the channel, as depicted in FIG. 10 by the combiner 1008. The non-orthogonally combined transmissions are then received by the receiving wireless device 1010.

To facilitate decoding of both the transmissions combined on the channel, the User A wireless device 1002 and the User B wireless device 1006 may employ joint modulation and encoding that is adapted to facilitate joint decoding of the transmissions that have collided. Referring now to FIG. 11, a block diagram is shown conceptually illustrating error correcting code for the two transmissions from FIG. 10 according to at least one example. In this illustration, the circles represent the bits and the parity checks associated with those bits are depicted by the squares. Generally speaking, each parity check is tied to multiple bits, and each bit is associated with multiple parity checks. In this diagram, each block showing pi ($\pi$) represents an interleaver. When the number of edges is proportional to the number of bit nodes, then the parity check code may be a low-density parity-check (LDPC) code. In the example in FIG. 11, the wireless device 1002 for User A from FIG. 10 can transmit the LDPC code 1102 on the top, and the wireless device 1006 for user B transmitting an overlapping thinframe can be the LDPC code 1104 on the bottom. The middle layer is a block diagram representation that the two colliding signals are added together on the channel, as is also depicted in FIG. 10. In this example of asynchronous frame multiplexing, the parity check constraints are distributed to allow short frame iterative decoding with a sub-frame of longer frame structure. This example can also be generalized to cases where the framing across the two users is equal but offset in time.

With such a structure, where the two transmissions are encoded and then added together on the channel, a receiver can decode both signals with a joint decoder. That is, the low-density parity-check (LDPC) codes and the collision structure depicted in FIG. 11 can be used for iterative decoding of the two users simultaneously. The receiving wireless device (e.g., a base station or other receiving wireless device) can accordingly decode the two signals.

Turning to FIG. 12, an example of the process of FIG. 8 is depicted for non-orthogonal uplink transmissions with joint uplink decoding. As shown, two transmitting devices, User A 1202 and User B 1204 employ aspects of the disclosure to send non-orthogonal uplink transmissions to a receiving device 1206. According to aspects of the present disclosure, each of the User A device 1202, the User B device 1204, and the receiving device 1206 may be implemented according to one or more embodiments of the wireless communication device 700 described above with reference to FIG. 7.

Initially, the User A device 1202 and the User B device 1204 each sends a respective pilot signal transmission 1208, 1210 to the receiving device 1206 for channel estimation. Based at least in part on the pilot signals, the receiving device 1206 can estimate an achievable rate allocation across users at 1212. For example, the receiving device 1206 can estimate the two rates together that the two user devices 1202, 1204 can support.

Using the estimated pair of achievable rate allocations for the two user devices, the receiving device 1206 can provide a respective grant 1214, 1216 to each user device 1202, 1204. The grant includes a code format to be used for the non-orthogonal transmission from the two user devices 1202, 1204. In at least one example, the code format may include a low-density parity-check (LDPC) code. According to an aspect, the selected code formats can be adaptive. That is, if the channel estimate is good (e.g., relatively good signal-to-noise ratios), the receiving device can select higher rates that together are jointly decodable, and if the channel estimate is bad (e.g., relatively bad signal-to-noise ratios), the receiving device can select lower rates.

Using the indicated code format, the User A device 1202 and the User B device 1204 each sends an uplink transmission 1218, where at least a portion of the two uplink transmissions overlap in a non-orthogonal manner. In order to differentiate the two non-orthogonal transmissions from the user devices, each transmission may employ a unique PN.

At 1220, the receiving device 1206 can then jointly decode the non-orthogonal uplink transmissions from the two user devices 1202, 1204. That is, instead of decoding one of the uplink transmissions, and then removing the decoded uplink transmission from the uplink stream to decode the other uplink transmission, the receiving device 1206 can decode the two transmissions at least substantially simultaneously.

For example, the receiving device can employ the received bits on the channel from both transmissions to obtain initial estimates regarding the received symbols. More specifically, the receiving device 1206 can employ the channel estimates propagated out to determine the bit estimates based on parity checks. The receiving device 1206 can then employ the bit estimates as a priori knowledge to revisit the channel and improve the bit estimates utilizing the a priori information. In this manner, the transmissions from the User A device 1202 and the User B device 1204 can both be utilized together to obtain improved channel estimates, which enables both transmissions to obtain improvements in decoding. In other words, the channel estimates obtained for the User A transmission are utilized in decoding and estimating the channel for the User B transmission, and vice versa. The receiving device 1206 can utilize the different PNs employed by the User devices to differentiate which symbol is associated with which user device.

Figure 13:
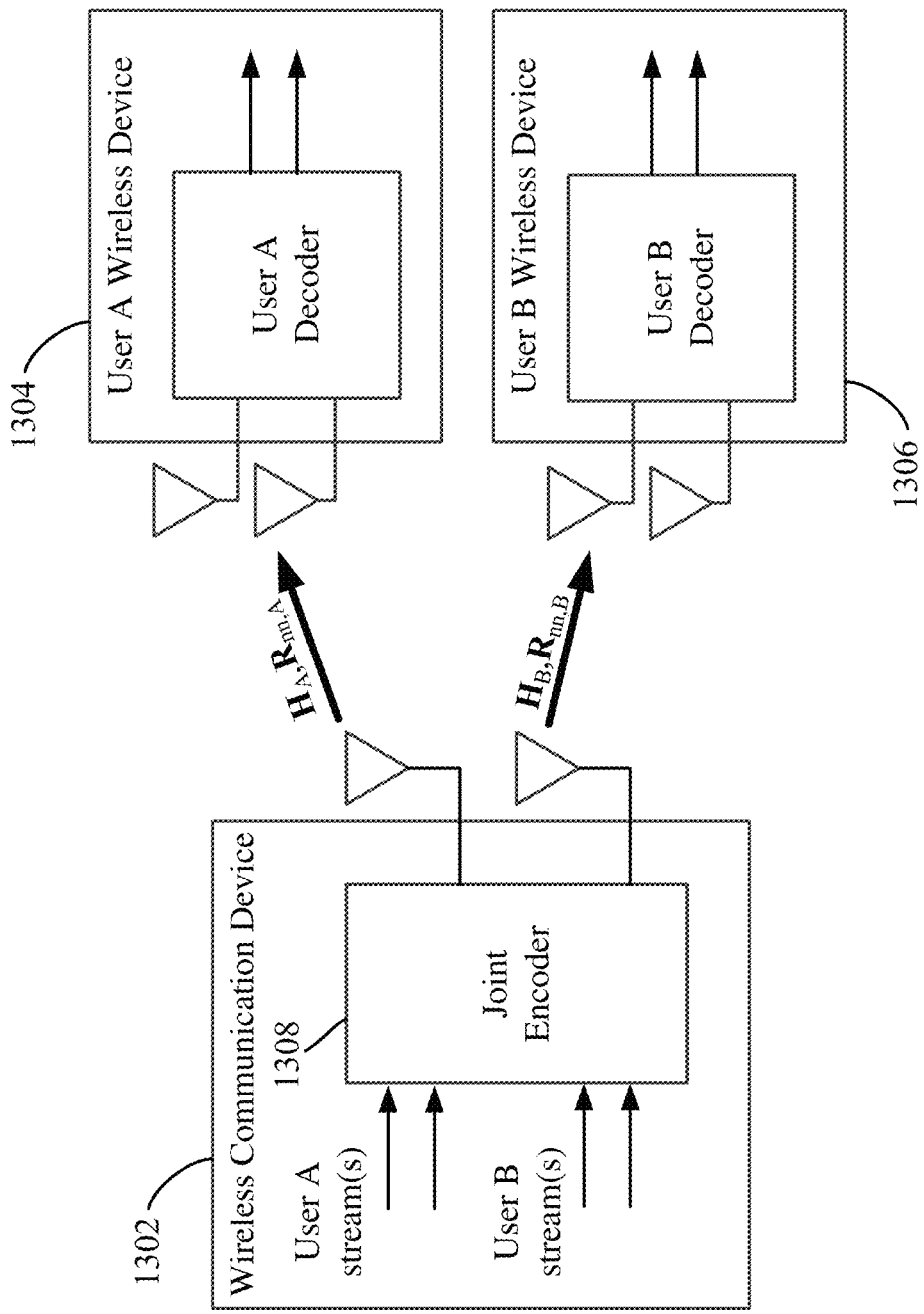
FIG. 13 is a block diagram illustrating a general non-orthogonal downlink transmission according to at least one example.

FIGS. 13-16 provide additional examples of downlink transmissions including two or more non-orthogonal data streams. Turning now to FIG. 13, a block diagram is shown illustrating a non-orthogonal downlink transmissions according to at least one example. In the example of FIG. 13, each of the depicted wireless devices may be implemented by an embodiment of the wireless communication device 700 of FIG. 7.

As shown, a wireless communication device 1302 may be adapted to send downlink transmissions to two or more other wireless devices, such as the User A wireless device 1304 and the User B wireless device 1306. In some instances, the wireless device 1302 may obtain data to be sent to the User A device 1304, as well as data to be sent to the User B device 1306. According to aspects of the disclosure, the wireless device 1302 can combine the data for User B with the data for User A, and transmit the data for both devices in an overlapping non-orthogonal manner. For example, a thin-frame for the User B data can be combined with a long frame, or regular frame transmission for the User A data in a non-orthogonal manner so that both transmissions are sent simultaneously.

As depicted in FIG. 13, the encoder 708 (shown in FIG. 7) is implemented as a joint encoder 1308. The joint encoder 1308 is an example of an encoder 708 depicted in FIG. 7, where the encoder 708 is configured to encode data streams for User A and for User B for non-orthogonal transmission. The joint encoder 1308 may also non-orthogonally combine the data streams for User A and User B.

Figure 14:
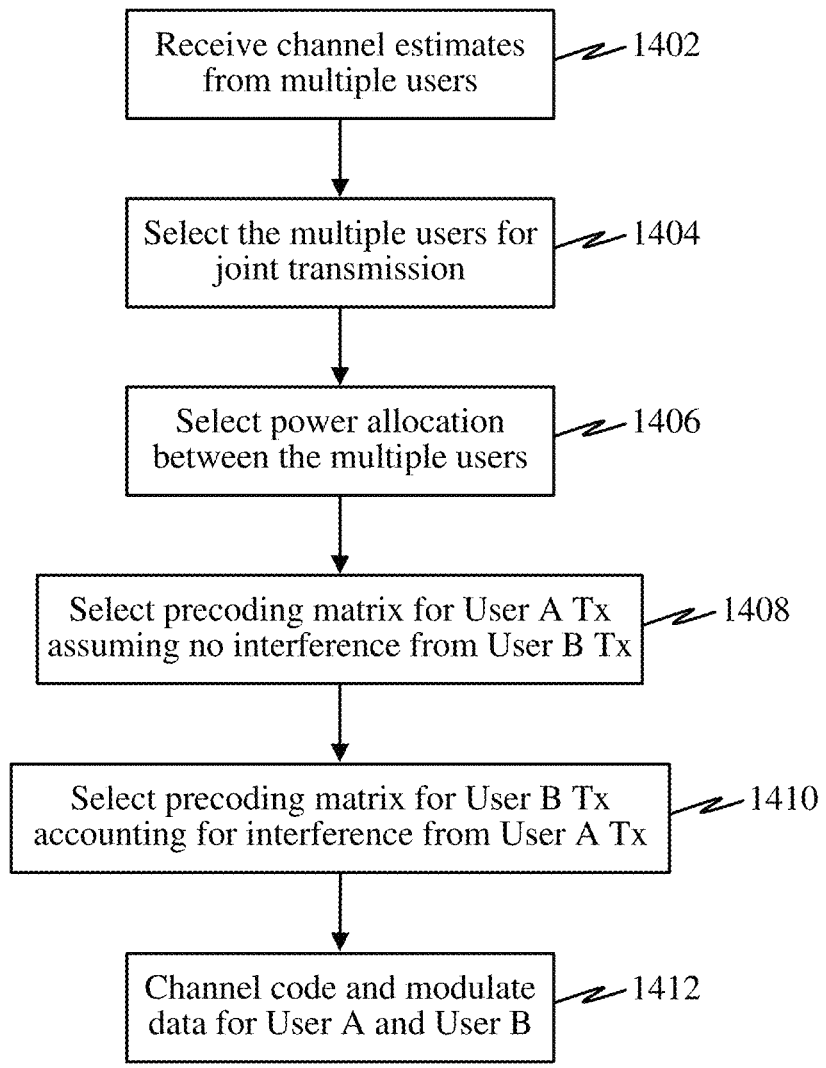
FIG. 14 is a flow diagram depicting one example of a process for encoding data for non-orthogonal downlink transmissions.

Referring now to FIG. 14, a flow diagram is shown depicting one example of a process for encoding data for a non-orthogonal transmissions according to step 804 in FIG. 8 for downlink transmission. The process of FIG. 14 may represent operations associated with configurations for the processing circuit 702 and/or programming included as part of the non-orthogonal transmission operations 716. With reference to FIGS. 7 and 14, the processing circuit 702 for a transmitting wireless device (e.g., wireless communication device 1302 in FIG. 13) receives channel estimates via the communications interface 704 from multiple users (e.g., User A wireless device 1304 and User B wireless device 1306 in FIG. 13) at operation block 1402.

Based on the channel estimates, the processing circuit 702 (e.g., the encoder 708) may be adapted to select the multiple users for joint transmission at operation block 1404.

Because data streams to the two users will be transmitted together (non-orthogonally), the power will be split between the two users' respective data streams. Therefore, at operation block 1406, the processing circuit 702 (e.g., the encoder 708) may be adapted to select a power allocation to be applied between the data stream to be transmitted to the User A wireless device 1304 and the data stream to be transmitted to the User B wireless device 1306. That is, a power allocation may be determined between a first data stream intended for the User A wireless device 1304 and a second data stream intended for the User B wireless device 1306. The processing circuit 702 (e.g., the encoder 708) may be adapted to select the power for the two devices based the demand for each user and/or based on some degree of fairness between the users. For example, the power allocation between the two users may be determined in such a way as to ensure that they will have equal rates, or to be fairly allocated between the two users.

At operation block 1408, the processing circuit 702 (e.g., the encoder 708) may be adapted to select a precoding matrix for the data stream intended for the User A wireless device 1304 assuming there is no interference from the data stream intended for the User B wireless device 1306. The processing circuit 702 (e.g., the encoder 708) executing the non-orthogonal transmission operations 716 can select the precoding matrix for the first data stream for the User A wireless device 1304 assuming no interference from the second data stream for the User B wireless device 1306 because the interference from the second data stream will either be canceled at the User A device 1304 or it will be pre-canceled by the transmitter, as will be discussed in further detail below.

At operation block 1410, the processing circuit 702 (e.g., the encoder 708) may be adapted to also select a precoding matrix for the second data stream intended for the User B wireless device 1306. In this case, the precoding matrix for the second data stream intended for the User B wireless device 1306 is selected with the knowledge that the first data stream intended for the User A device 1304 will create interference with the second data stream intended for the User B device 1306.

At operation block 1412, the processing circuit 702 (e.g., the encoder 708) may be adapted to code and modulate the two data streams (e.g., the first data stream intended for the User A device 1304 and the second data stream intended for the User B device 1306). These coded and modulated data streams can then be sent non-orthogonally on the same channel to the two receiving devices (User A wireless device 1304 and User B wireless device 1306), as described above with reference to 806 in FIG. 8.

Figure 15:
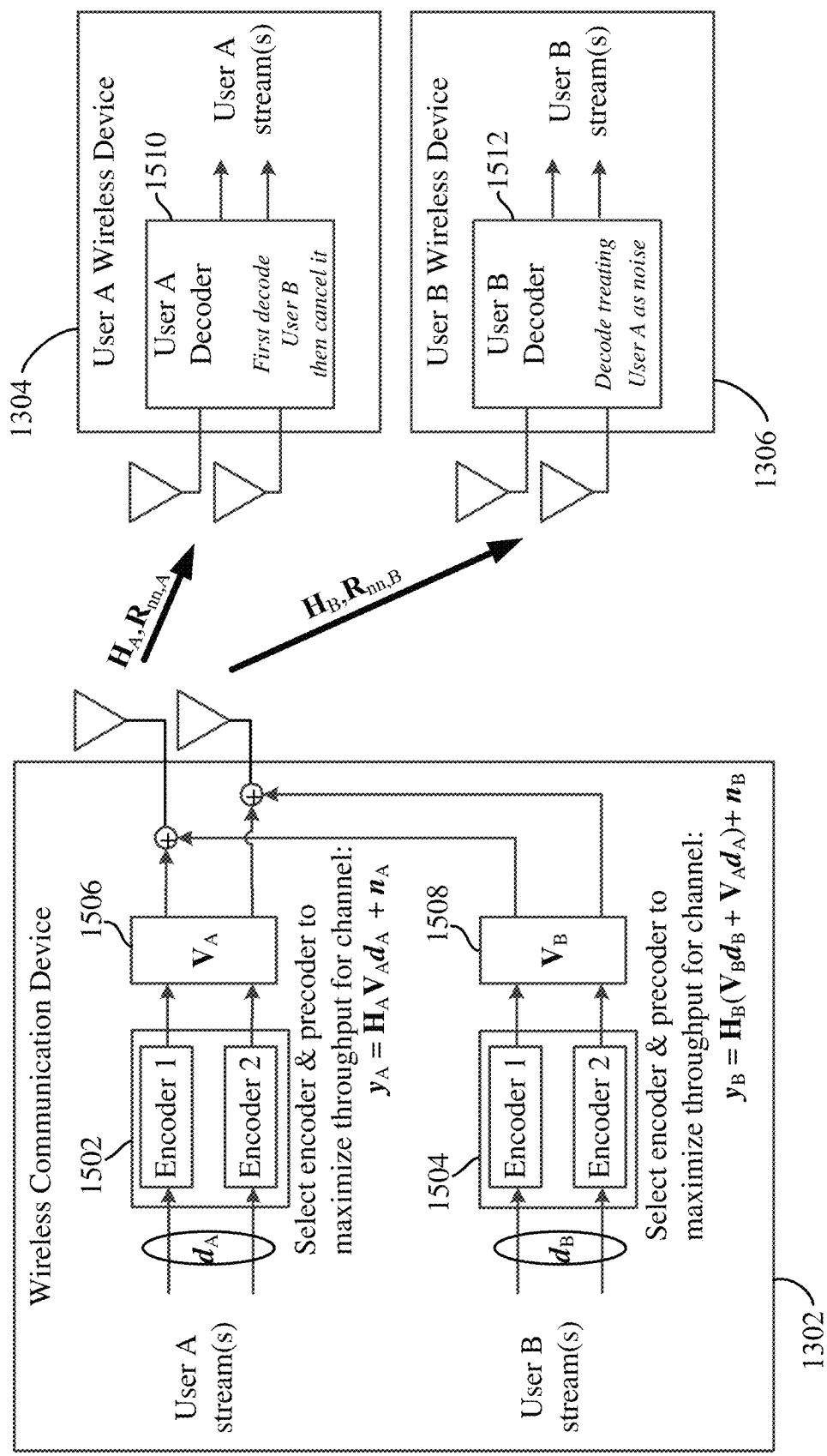
FIG. 15 is a block diagram depicting an example of the non-orthogonal multiple access downlink transmissions using superposition coding.
Figure 16:
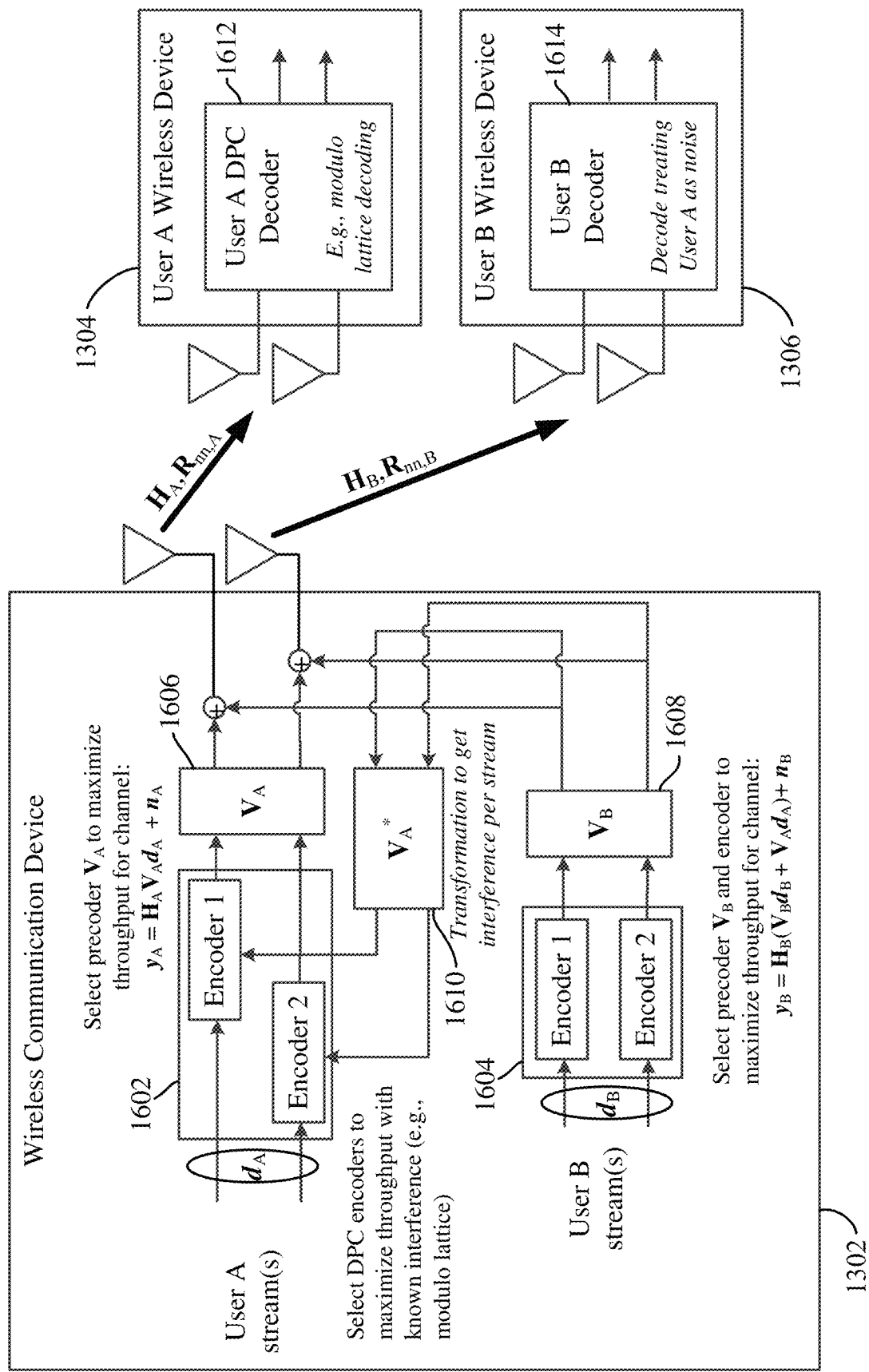
FIG. 16 is a block diagram depicting an example of the non-orthogonal multiple access downlink transmissions using dirty-paper coding.

Some more specific examples of encoding non-orthogonal downlink transmissions according to step 804 in FIG. 8, as well as examples of configurations to encoder 708 for performing such non-orthogonal downlink transmissions will now be described with reference to FIGS. 15 and 16.

In one example, the processing circuit 702 (e.g., the encoder 708) may be adapted to use superposition coding (SPC) for the two data streams. Referring to FIG. 15 a block diagram is shown depicting an example of the non-orthogonal multiple access downlink transmissions using superposition coding. In this example, the two data streams are simply superimposed on top of each other, such that one receiving device will decode the other data stream and cancel it. In this example, it is assumed that the strong user (e.g., the user with the best channel quality) will decode the data stream for the weak user (e.g., the user with the lower channel quality), and then cancel that data stream to decode the data stream intended for the strong user, while the weak user can decode the data stream with the extra interference and without similar cancellation. This feature may be applicable because the noise is already significant on the channel for the weak user, and the cancellation of the interference caused by the data stream for the strong user is somewhat inconsequential. That is, the weak user obtains very little benefit to cancelling the interference from the data stream for the strong user, since there will still be significant noise on the channel. On the other hand, the strong user has less noise on the channel. When the two data streams are sent together, the data stream for the weak user may become the dominant source of noise on the channel for the strong user, such that cancellation of the noise caused by the weak user's data stream can enable better decoding by the strong user.

As shown, the wireless communication device 1302 includes a joint encoder with one or more encoders 1502 for encoding one or more data streams associated with the User A data and one or more encoders 1504 for encoding one or more data streams associated with the User B data. Although multiple encoders are depicted in FIG. 15, it will be apparent to those of ordinary skill in the art that a single encoder may be employed to encode each of the data streams for each transmission, as well as multiple encoders.

The joint encoder further includes one or more precoders, such as the precoders 1506 and 1508. In this example, the first precoder 1506 can select a precoding matrix for the User A data stream(s) assuming no interference from the User B transmission. The second precoder 1508 can select a precoding matrix for the User B data stream(s), where the second precoder 1508 takes into account the interference that will result from the User A data stream(s).

More specifically, the wireless communication device 1302 (e.g., the joint encoder 1308 in FIG. 13) selects encoding and precoding for the stream associated with each user, User A and User B. The encoder 1502 for the User A stream(s) can encode (e.g., turbo code, LDPC) the data stream(s) for User A, and the precoder 1506 can select the precoding matrix for User A assuming no interference from User B (e.g., $y_A=H_A V_A d_A + n_A$). The encoder 1504 for the User B streams can encode the data stream(s) for User B, and the precoder 1508 can select the precoding matrix for the User B data stream by taking into account the data stream for User A (e.g., $y_B=H_B(V_B d_B + V_A d_A) + n_A$). Because of the non-orthogonal nature of the transmission, each of the encoders 1502, 1504 may select a lower code rate to handle the interference from the other user's data stream, and the precoding matrix may be selected by the precoders 1506, 1508 in a manner to compensate for the interference.

In the depicted example, the User A wireless device 1304 is the strong user and the User B wireless device 1306 is the weak user. Accordingly the User A decoder 1510 of the User A wireless device 1304 first decodes the User B data stream and cancels it from the received transmission to decode the User A data stream. The User B decoder 1512 of the User B wireless device 1306 decodes the User B data stream treating the User A data stream as noise.

In one example, the wireless communication device 1302 may use Marton coding, which is also known as dirty-paper coding (DPC), for the two data streams. Referring to FIG. 16 a block diagram is shown depicting an example of the non-orthogonal multiple access downlink transmissions using dirty-paper coding. In this example, the wireless communication device 1302 includes a joint encoder with one or more encoders 1602 for encoding one or more data streams associated with the User A data and one or more encoders 1604 for encoding one or more data streams associated with the User B data. Although multiple encoders are depicted in FIG. 16, it will be apparent to those of ordinary skill in the art that a single encoder may be employed to encode each of the data streams for each transmission, as well as multiple encoders.

The joint encoder further includes one or more precoders, such as the precoders 1606 and 1608. In this example, the first precoder 1606 can select a precoding matrix for the User A data stream(s) accounting for interference from the User B data stream(s). More specifically, a transformation precoder 1610 may be employed to utilize the results from the encoding and precoding of the User B data stream(s) to provide an input to the encoder 1602 for encoding and then precoding at the precoder 1606 the User A data stream(s). The second precoder 1608 can select a precoding matrix for the User B data stream(s) based on a standard calculation as if there would be no interference from the User A data stream(s).

In this example, the first encoder 1602 and precoder 1606 can encode and precode the User A data stream(s) accounting for the interference that will be caused by the User B transmission. For instance, the encoder 1602 can pre-subtract relative to some other symbol set. By way of an example, assuming User A has some set of constellation points, a desired constellation is determined for use for the User A transmission. Taking account for the User B transmission that will be added to, and cause interference with the User A transmission, a new constellation can be calculated for the User A transmission, such that adding the new constellation for the User A transmission to the interference caused by the User B transmission results in the desired constellation for the User A transmission. That is, the wireless communication device 1302 can select a new constellation point for the User A transmission based on the determination that the interference caused by the User B transmission will push the User A transmission into the desired constellation point for the User A transmission.

More specifically, the second encoder 1604 may encode the User B data stream(s) and the second precoder 1608 may select a precoding matrix for the User B data stream(s) assuming no interference from the User A data stream(s). The results of the encoded User B data can be provided to the transformation precoder 1610 to be utilized in preparing (e.g., encoding and precoding) the User A data stream(s). In one example, 4 QAM may be employed for the User A data stream(s), and it may be determined that the User A data stream is to be sent with a (1,1) mapping. Assuming that the transformation precoder 1610 determines that the User B data stream will add a value of 2 of interference to the transmission point for the User A data stream, then the first encoder 1602 and first precoder 1606 can prepare the User A data stream for a (1,−1) mapping to compensate for the interference caused by the User B data stream. That is, in order to obtain a (1,1) mapping for the User A data stream, the wireless communication device 1302 can select a (1,−1) transmission for the User A data stream because it is determined that the interference caused by the User B data stream will push the User A data stream into the (1,1) location. Although 4 QAM is described in this example, it should be apparent that any modulation scheme can be employed. Further, in this example, the User A data stream will experience wrap around, which may also be referred to as modulo lattice, which wrap around may be dealt with by the decoding device.

At the User A wireless device 1304, the User A data stream will be found in the expect constellation, as a result of the interference as described above. The User A device 1304 can decode the data stream at the decoder 1612. The decoder 1612 can be configured to take into account wrap around (or modulo lattice) that may occur when the User A data stream is transmitted as described above. At the User B wireless device 1306, the User B data stream is decoded by the decoder 1614. The User B decoder 1614 can be configured to treat the User A data stream as noise when decoding the User B data stream.

Figure 17:
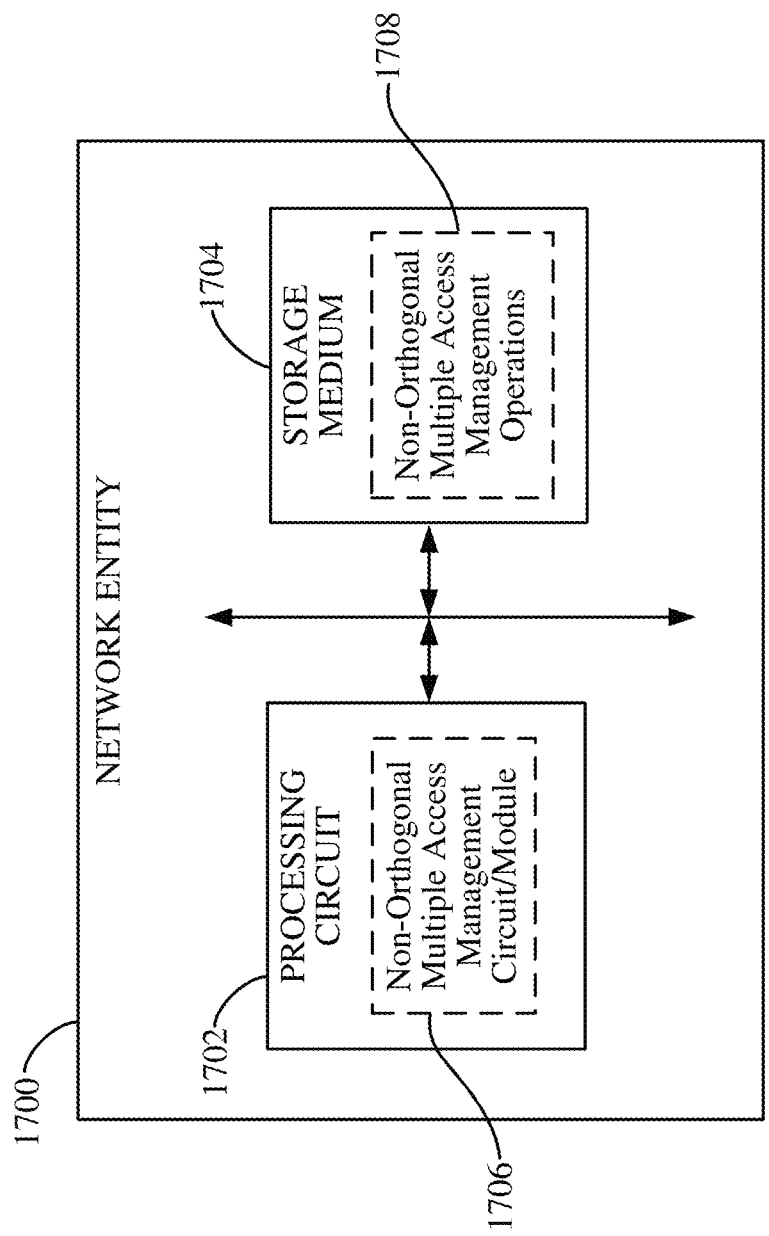
FIG. 17 is a block diagram illustrating select components of a network entity according to at least one example.

Further aspects of the present disclosure relate to capabilities of the network to manage non-orthogonal multiple access among a plurality of wireless communication devices. Turning to FIG. 17, a block diagram is shown illustrating select components of a network entity 1700 according to at least one example. The network entity 1700 may include a processing circuit 1702 coupled to or placed in electrical communication with a storage medium 1704.

The processing circuit 1702 includes circuitry arranged to obtain, process and/or send data, control data access and storage, issue commands, and control other desired operations. The processing circuit 1702 may include circuitry adapted to implement desired programming provided by appropriate media in at least one example, and/or circuitry adapted to perform one or more functions described in this disclosure. The processing circuit 1702 may be implemented and/or configured according to any of the examples of the processing circuit 702 described above with reference to FIG. 7.

In some instances, the processing circuit 1702 may include a non-orthogonal multiple access management circuit and/or module 1706. The non-orthogonal multiple access management circuit and/or module 1706 may include circuitry and/or programming (e.g., programming stored on the storage medium 1704) adapted to manage the level of non-orthogonal multiple access that may be employed, as described herein.

The storage medium 1704 may represent one or more processor-readable devices for storing programming, such as processor executable code or instructions (e.g., software, firmware), electronic data, databases, or other digital information. The storage medium 1704 may be configured and/or implemented in a manner similar to the storage medium 706 described above with reference to FIG. 7.

The storage medium 1704 may be coupled to the processing circuit 1702 such that the processing circuit 1702 can read information from, and write information to, the storage medium 1704. That is, the storage medium 1704 can be coupled to the processing circuit 1702 so that the storage medium 1704 is at least accessible by the processing circuit 1702, including examples where the storage medium 1704 is integral to the processing circuit 1702 and/or examples where the storage medium 1704 is separate from the processing circuit 1702 (e.g., resident in the network entity 1700, external to the network entity 1700, distributed across multiple entities).

The storage medium 1704 may include programming stored thereon. Such programming, when executed by the processing circuit 1702, can cause the processing circuit 1702 to perform one or more of the various functions and/or process steps described herein. In at least some examples, the storage medium 1704 may include non-orthogonal multiple access management operations 1708 adapted to cause the processing circuit 1702 to manage the non-orthogonal multiple access within one or more wireless communication devices in a wireless network.

Thus, according to one or more aspects of the present disclosure, the processing circuit 1702 is adapted to perform (independently or in conjunction with the storage medium 1704) any or all of the processes, functions, steps and/or routines for any or all of the network entities described herein (e.g., base station 102, network entity 1700). As used herein, the term "adapted" in relation to the processing circuit 1702 may refer to the processing circuit 1702 being one or more of configured, employed, implemented, and/or programmed (e.g., in conjunction with the storage medium 1704) to perform a particular process, function, step and/or routine according to various features described herein.

In some aspects, a network entity 1700 may be adapted to coordinate the amount of non-orthogonal multiple access a particular wireless communication device (e.g., a base station) may be enabled to facilitate at a given time.

Figure 18:
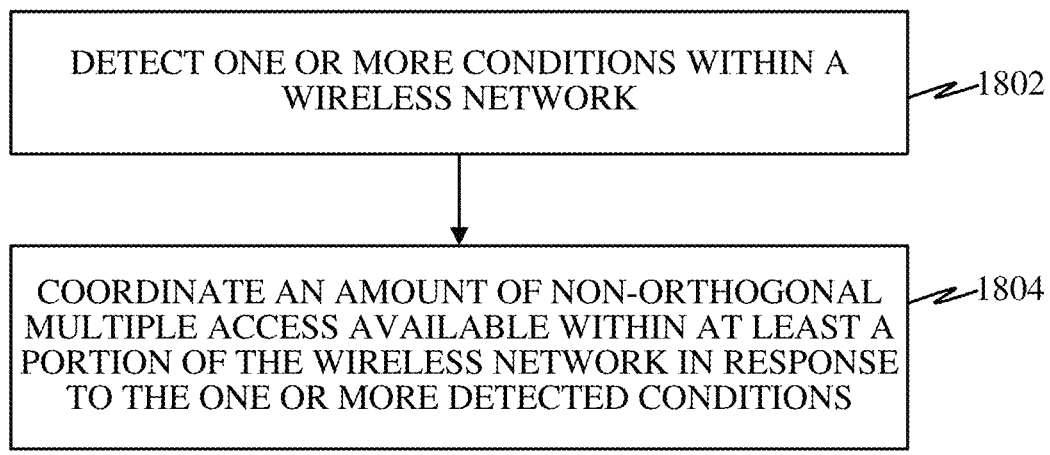
FIG. 18 is a flow diagram illustrating a method operational on a network entity according to at least one example.

FIG. 18 is a flow diagram illustrating at least one example of a method operational on a network entity, such as the network entity 1700. Referring to FIGS. 17 and 18, a network entity 1700 may detect one or more conditions within a wireless network at 1802. For example, the processing circuit 1702 (e.g., the non-orthogonal multiple access management circuit/module 1706) may be adapted to monitor one or more aspects within a wireless network to detect conditions within the wireless network.

At 1804, the network entity 1700 may coordinate an amount of non-orthogonal multiple access available within at least a portion of the wireless network in response to the one or more detected conditions. For example, the processing circuit 1702 (e.g., the non-orthogonal multiple access management circuit/module 1706) may be adapted to adjust one or more levels of non-orthogonal multiple access available within a portion of the network at a given period of time based on the detected conditions.

In one example, the processing circuit 1702 (e.g., the non-orthogonal multiple access management circuit/module 1706) may be adapted to deploy static capacity for providing a determined amount of traffic that is non-orthogonal, such as an amount of synchronous traffic that is allowed to collide and/or an amount of asynchronous traffic that is allowed to collide. One example of this may include limiting the non-orthogonal traffic to the lowest payload. Another example of this may include limiting the non-orthogonal traffic to specific registered devices. In this instance, when a device registers with the network, the network can tell a registering device whether there is bandwidth available for non-orthogonal multiple access, and whether all communications will need to be orthogonal multiple access or whether at least some communications can be non-orthogonal multiple access.

In another example, the processing circuit 1702 (e.g., the non-orthogonal multiple access management circuit/module 1706) executing the non-orthogonal multiple access management operations 1708 can coordinate and choose whether to increase or decrease non-orthogonal multiple access. In some implementations, the processing circuit 1702 (e.g., the non-orthogonal multiple access management circuit/module 1706) may be adapted to cause a message to be broadcast, where the broadcast message indicates whether the network is accepting non-orthogonal multiple access. For instance, if a detected condition includes information that a base station is heavily loaded, the base station could be instructed by the network entity 1700 (or on its own accord if the base station is the relevant network entity 1700) to broadcast a message indicating that it will not accept any non-orthogonal multiple access or an increase in non-orthogonal multiple access. On the other hand, if the detected condition includes an indication that the network is lightly loaded, a message can be broadcast indicating that non-orthogonal multiple access and asynchronous transmissions will be allowed.

In some instances, the processing circuit 1702 (e.g., the non-orthogonal multiple access management circuit/module 1706) may be adapted to determine and indicate modulation and coding techniques to be employed for non-orthogonal downlink transmissions. For example, the processing circuit 1702 (e.g., the non-orthogonal multiple access management circuit/module 1706) may be adapted to instruct a downlink transmitter to employ one of superposition coding, Marton coding (also known as "dirty-paper" coding), and low-density parity-check (LDPC) coding based on one or more conditions within the network.

In some instances, the processing circuit 1702 (e.g., the non-orthogonal multiple access management circuit/module 1706) may be adapted to scale non-orthogonal multiple access based on operation across numerous base stations. For example, if the processing circuit 1702 (e.g., the non-orthogonal multiple access management circuit/module 1706) determines that a particular base station has neighboring base stations that are significantly loaded, the network entity 1700 can enable or increase non-orthogonal multiple access at the base station to help relieve the load on the neighboring base stations.

While the above discussed aspects, arrangements, and embodiments are discussed with specific details and particularity, one or more of the components, steps, features and/or functions illustrated in FIGS. 1, 2, 3, 4, 5, 6, 7, 8, 9, 10, 11, 12, 13, 14, 15, 16, 17, and/or 18 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 7, 10, 13, 15, 16, and/or 17 may be configured to perform or employ one or more of the methods, features, parameters, and/or steps described in FIGS. 2, 3, 4, 5, 6, 8, 9, 11, 12, 14, and/or 18. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A wireless communication device, comprising:
    a receiver circuit configured to receive a wireless downlink transmission comprising a first data stream non-orthogonally combined with a second data stream, wherein the first data stream is received in an expected constellation within the wireless transmission as a result of interference caused by the non-orthogonally combined second data stream; and
    a decoder coupled to the receiver circuit to obtain the wireless transmission, the decoder configured to decode the first data stream from the expected constellation within the wireless transmission, while accounting for modulo lattice within the first data stream resulting from the non-orthogonal combination of the first data stream and the second data stream.

2. The wireless communication device of claim 1, wherein the first user data stream is intended for the wireless communication device as a strong user with a first channel quality, and the second user data stream intended for another device as a weak user with a second, lower channel quality compared to the first channel quality.

3. A method operational on a wireless communication device, comprising:
    receiving a wireless downlink transmission comprising a first data stream non-orthogonally combined with a second data stream, wherein the first data stream is received in an expected constellation within the wireless transmission as a result of interference caused by the non-orthogonally combined second data stream; and
    decoding the first data stream from the expected constellation within the wireless transmission, while accounting for modulo lattice within the first data stream resulting from the non-orthogonal combination of the first data stream and the second data stream.

4. The method of claim 3, wherein the first user data stream is intended for the wireless communication device as a strong user with a first channel quality, and the second user data stream intended for another device as a weak user with a second channel quality, wherein the second channel quality is lower than the first channel quality.

* * * * *